(12) United States Patent
Iwata et al.

(10) Patent No.: US 12,231,572 B2
(45) Date of Patent: Feb. 18, 2025

(54) SSL COMMUNICATION SYSTEM, CLIENT, SERVER, SSL COMMUNICATION METHOD, AND COMPUTER PROGRAM

(71) Applicant: NTI, Inc., Yokkaichi (JP)

(72) Inventors: Akira Iwata, Yokkaichi (JP); Takatoshi Nakamura, Yokkaichi (JP)

(73) Assignee: NTI, INC., Mie (JP)

( * ) Notice: Subject to any disclaimer, the term of this patent is extended or adjusted under 35 U.S.C. 154(b) by 960 days.

(21) Appl. No.: 16/322,530

(22) PCT Filed: Aug. 4, 2017

(86) PCT No.: PCT/JP2017/028392
§ 371 (c)(1),
(2) Date: Oct. 11, 2021

(87) PCT Pub. No.: WO2018/030289
PCT Pub. Date: Feb. 15, 2018

(65) Prior Publication Data
US 2022/0029819 A1    Jan. 27, 2022

(30) Foreign Application Priority Data

Aug. 8, 2016  (JP) ................................. 2016-155832

(51) Int. Cl.
*H04L 9/32* (2006.01)
*H04L 9/08* (2006.01)
*H04L 9/40* (2022.01)

(52) U.S. Cl.
CPC .......... *H04L 9/3247* (2013.01); *H04L 9/0825* (2013.01); *H04L 9/3263* (2013.01); *H04L 63/0428* (2013.01); *H04L 63/166* (2013.01)

(58) Field of Classification Search
None
See application file for complete search history.

(56) References Cited

U.S. PATENT DOCUMENTS

| | | | | |
|---|---|---|---|---|
| 2007/0234043 | A1* | 10/2007 | Miyazawa | G06F 21/85 713/156 |
| 2011/0305334 | A1* | 12/2011 | Nakamura | H04L 9/14 380/255 |
| 2014/0325231 | A1* | 10/2014 | Hook | H04L 9/088 713/171 |

(Continued)

Primary Examiner — Sakinah White Taylor
(74) *Attorney, Agent, or Firm* — Edell, Shapiro & Finnan, LLC

(57) ABSTRACT

SSL is improved with stronger defense against an attack from a third party, in particular, an MITMA. A client and a server each have the function of generating the same solution under the same conditions. The client generates a first solution (S1002) and transmits the solution to the server (S1003). When receiving the solution, the server generates a solution (S2002) and authenticates the client if the solution agrees with the solution received from the client (S2003). The server generates a new solution (S2004), encrypts a server certificate and an SSL certificate (S2005) by using the solution, and then transmits the certificates to the client (S2006). The client generates a new solution (S1005) and decrypts the server certificate and the SSL certificate by using the solution (S1006). The subsequent processing is identical to that of current SSL communications.

12 Claims, 9 Drawing Sheets

(56) References Cited

U.S. PATENT DOCUMENTS

| | | | |
|---|---|---|---|
| 2015/0172064 A1* | 6/2015 | Takenaka | H04L 9/3247 |
| | | | 713/156 |
| 2016/0080157 A1* | 3/2016 | Lundström | H04L 63/126 |
| | | | 713/176 |
| 2016/0149873 A1* | 5/2016 | Dickinson | G06Q 20/3829 |
| | | | 713/171 |
| 2016/0294553 A1* | 10/2016 | Hattori | H04L 63/06 |

* cited by examiner

SSL COMMUNICATION SYSTEM, CLIENT, SERVER, SSL COMMUNICATION METHOD, AND COMPUTER PROGRAM

TECHNICAL FIELD

The present invention relates to a communication technique and more specifically relates to a technique for encrypted communications.

BACKGROUND ART

For example, in the case of payment to an on-line shop on the Internet and checking of the balance on his/her account or remittance to a third party through Internet banking, a user performs communications between his/her terminal (client) and the server of a shop or the like over the Internet. Naturally, such communications require a high degree of confidentiality and thus techniques for encrypted communications are used.

A so-called SSL (secure sockets layer) technique has been practically used as a technique for encrypted communications. In the present application, SSL surely includes TLS (transport layer security) that is a standardized protocol of SSL.

SSL mainly has two aspects. One aspect is identification (authentication) and the other aspect is encrypted communications. Processing in SSL communications will be discussed below to explain the implementation of the aspects.

In this example, SSL communications are performed between a client and a server.

(1) Preprocessing a. A server generates a pair of a private key and a public key. As is commonly known, a private key and a public key both can encrypt plaintext data into encrypted data and decrypt data encrypted by the other key into plaintext data. In the server, a server certificate is installed as data that allows the other party to verify the authenticity of the server. The server certificate includes the public key of the server and has a digital signature for indicating the authenticity of the server certificate. If authentication fails on the server as well as the server certificate only with the digital signature of the server certificate, an SSL certificate (including a route certificate) for indicating the authenticity of the digital signature of the server certificate is also installed on the server by a certification authority (including a route certification authority) at a higher rank than a certification authority (will be discussed later) that has placed the digital signature.

b. The client prepares a common key. As is commonly known, a common key can encrypt plaintext data into encrypted data and decrypt data encrypted by the same common key into plaintext data.

c. An SSL certificate (including a route certificate) is installed for the client. The SSL certificate is created by a certification authority. The certification authority creates the server certificate and attaches the digital signature to the server certificate. The client can verify the authenticity of the server certificate according to a combination of the SSL certificate and the digital signature attached to the server certificate.

(2) Sharing of the Common Key Between the Server and the Client a. The client requests SSL communications from the server.

b. The server transmits the server certificate to the client. In some cases, the SSL certificate is also transmitted at the same time. As described above, the server certificate includes the public key used by the server and is attached with the digital signature.

c. The client verifies the authenticity of the server certificate by using the SSL certificate of the client and the digital signature attached to the server certificate. If the server certificate is authorized, the client authenticates the server communicating with the client. If the server certificate is unauthorized, the client does not authenticate the server. If the authenticity of the digital signature attached to the server certificate cannot be evaluated by itself, the client attempts to authenticate, by using the SSL certificate of the client, the digital signature attached to the SSL certificate from the server certificate indicating the authenticity of the digital signature attached to the server certificate. The server is authorized only in the case of successful authentication.

d. If the client authenticates the server, the common key of the client is encrypted by the public key included in the server certificate received from the server and is transmitted to the server.

e. The server decrypts the encrypted common key from the client with the private key of the server. Thus, the common key of the client is shared between the client and the server.

(3) Encrypted Communications Between the Server and the Client

The server and the client both transmit encrypted data to the other party, the data being encrypted with the common keys of the server and the client. The server and the client both decrypt encrypted data from the other party with the common keys of the server and the client. This enables encrypted communications between the server and the client.

The above-mentioned processing is performed in SSL communications.

Roughly speaking, only encrypted communications between the server and the client in (3) are required in SSL communications. The key point of SSL communications is encrypted communications with a common key. This is because encrypted communications with a common key is considerably lighter processing than encrypted communications with a public key and a private key.

For the encrypted communications, it is necessary to share the common key between the server and the client. In order to implement the encrypted communications, the common key is transmitted from the client to the server by using the public key and the private key of the server, which is the processing of (2) for SSL communications. As described above, in encrypted communications with the public key and the private key, the different keys are used for encryption and decryption. Hence, even if the common key encrypted for the client with the public key is stolen by a malicious third party when being transmitted from the client to the server, the third party does not have the private key and thus the common key of the client is not stolen by the third party. This result is not affected by the publication of the public key.

When the common key is transmitted from the client to the third party, as described above, the public key transmitted from the server to the client is used. In this case, however, the authenticity of the public key and the authenticity of the sender (server) of the public key are significant. This is because a malicious third party or the like may transmit a public key to the client. The authenticity of the public key and the sender is ensured by the processing of (1) and (2) describing SSL communications. The client verifies the authenticity of (authenticates) the server through the processing, thereby ensuring the authenticity of SSL communications.

SUMMARY OF INVENTION

Technical Problem

As described above, it seems that a malicious third party cannot enter SSL communications. However, wiretapping by malicious third parties occurs in actual SSL communications. For example, in Internet banking, users frequently become victims of crimes such as unintended transfer of money from a user account to the account of a third party who is a complete stranger to the user.

The causes of such crimes include, for example, tampering of an SSL certificate for a client by techniques such as hacking or the use of computer viruses. Moreover, route certificates generally have expiration dates but many users do not update their route certificates at their clients. Thus, the route certificates in the clients may be placed into the same state as tampering. In many cases, a server administrator is provided with techniques that can sufficiently defend a server certificate and an SSL certificate against an attack from a third party. Moreover, the server administrator ordinarily updates a route certificate in a correct manner, so that the foregoing problem is mainly caused by the client.

If the route certificate of a client is tampered, a malicious third party creates a fake server certificate such that the authenticity of the third party is verified by a client with the tampered SSL certificate. When the user requests SSL communications from an authorized server, the third party pretends to be the authorized server and receives the request between the client and the authorized server. Thereafter, the fake server that pretends to be the authorized server transmits the fake server certificate to the client. Thus, the client determines that the fake server certificate is authorized by the improved route certificate, so that the client authenticates the fake server. This causes the client to encrypt the common key of the client with a fake public key included in the fake server certificate and transmit the common key to the fake server. The fake server that receives the common key decrypts the encrypted common key with a private key paired with the fake public key. This transfers the common key of the client to the malicious third party. Thereafter, even if communications between the client and the server are encrypted with the common key, the malicious third party who has the common key for the encrypted communications can freely decrypt the communications.

Such an attack of a malicious third party between a client and a server is referred to as a man-in-the-middle attack (MITMA) and is not prevented in SSL communications as in other encrypted communications.

In the field of encrypted communications, a sender and a receiver fundamentally have the same key (that is, communications in a common key system) and thus the way to share the same key has been a conventional problem. This problem is referred to as a problem of key distribution, which is not solved also in SSL communications.

As described above, SSL communications are performed in the common key system. One problem is how to safely distribute the common key of a client to a server. As described above, SSL communications aim to safely distribute the common key of a client to the server by using encrypted communications with a private key in the first stage and combining an authentication technique with a server certificate and a route certificate. However, as described above, the aim is not fully accomplished.

The present invention has been devised to propose a technique of SSL communications with strong defense against an attack from a third party and in particular, an MITMA.

Solution to Problem

The applicant assumes that the above-mentioned problem arises for the following reason.

In conventional SSL communications, a client authenticates a server by using a server certificate or the like. However, as described above, it is difficult to completely defend the client against an attack from a malicious third party.

Moreover, in the conventional SSL communications, the server does not authenticate the client. The inventors assume that the absence of authentication by the server is the cause of the above-mentioned problem.

It appears that the server capable of resisting an attack from a third party is more likely to perform correct authentication than the client. Moreover, interactive authentication between the client and the server surely increases the safety of communications regardless of whether the server is more likely to perform correct authentication than the client. Thus, the inventors assume that the server should also authenticate the client. However, the conventional SSL has developed for many years with server authentication using, for example, a server certificate and a route certificate. This may considerably increase the work and cost of changing or reforming such a mechanism. Any mechanism for client authentication by a server has not been proposed so as to be easily applied to such a mechanism.

The present invention proposed by the inventors relates to the mechanism.

In order to solve the problem, the present inventors propose the following inventions.

The present invention is an SSL communication method implemented by an SSL communication system including a server and a client. The server is connectable to a predetermined network and includes a private key, a server certificate for proving the authenticity of the server with a digital signature including a public key paired with the private key, an SSL certificate for proving the authenticity of the digital signature attached to the server certificate, and solution generating means capable of successively generating solutions. The client is connectable to the predetermined network and includes an SSL certificate for proving the authenticity of the digital signature attached to the server certificate and solution generating means capable of successively generating solutions identical to those of the solution generating means of the server in common conditions. The communication method can be regarded as an advanced method or an improved method of current SSL communications. The network in the present application is typically the Internet.

The present invention includes the following steps.

The present invention includes the steps of: causing the client to generate the solution by the solution generating means and transmit the solution to the server via the network; causing the server to receive the solution from the client via the network; causing the server to generate the solution by the solution generating means under the same conditions as the solution generated by the solution generating means of the client, compare the solution generated by the solution generating means of the server and the solution received from the client, and authenticate the client if the solutions agree with each other; causing the server to transmit the server certificate and the SSL certificate of the server to the client via the network if the server authenticates the client; causing the client to receive the server certificate and the SSL certificate from the server via the network; causing the client to verify the authenticity of the server certificate transmitted from the server, by using the SSL certificate transmitted from the server and the SSL certificate of the client; causing the client to encrypt, if the server certificate is authenticated, the common key of the client by using the public key included in the server certificate; causing the client to transmit the encrypted common key to the server via the network; causing the server to receive the encrypted common key; causing the server to decrypt the encrypted common key with the private key of the server; and performing encrypted communications in a common key system between the server and the client by using the common key shared between the server and the client in the above-mentioned steps.

The final step in the above-mentioned steps of the present invention, that is, the step of "performing encrypted communications in the common key system between the server and the client by using the common key shared between the server and the client in the above-mentioned steps" corresponds to the processing of (3) in current SSL communications.

From among the steps included in the present invention, the following steps preceding the last step are equivalent to b to e of (2) of current SSL communications: "causing the client to receive the server certificate and the SSL certificate from the server via the network"; "causing the client to verify the authenticity of the server certificate transmitted from the server, by using the SSL certificate transmitted from the server and the SSL certificate of the client"; "causing the client to encrypt, if the server certificate is authenticated, the common key of the client by using the public key included in the server certificate"; "causing the client to transmit the encrypted common key to the server via the network"; "causing the server to receive the encrypted common key"; and "causing the server to decrypt the encrypted common key with the private key of the server".

The common steps with current SSL communications can completely follow the processing of current SSL communications but are not limited thereto. Considering that server certificates widely used with public keys at present to have a huge economic impact or SSL certificates (including route certificates) for determining the authenticity of server certificates are used as they are, the present invention is highly compatible with current SSL communications and thus is easily applied to current SSL communications.

Furthermore, the present invention achieves a high level of security. The reason will be discussed below.

The invention features the solution generating means used by the client and the server. The client and the server may use the same solution generating means or different solution generating means. At least both the solution generating means must be able to generate at least successive identical solutions under common conditions. For example, a technique of one-time passwords is applicable to the solution generating means. Some methods are used for one-time passwords. For example, one-time passwords generated by two solution generating means in the same order are compared with each other and are found to be identical or one-time passwords generated by two solution generating means at the same time are compared with each other and are found to be identical. The solution generating means of the invention may be used according to any one of the methods if a technique of one-time passwords is used.

In the present invention, the client generates the solution by the solution generating means and transmits the solution to the server via the network. The solution is received by the server. The solution is used for authenticating the client in the server.

Specifically, when receiving the solution, the server generates the solution by the solution generating means under the same conditions as the solution generated by the solution generating means of the client. The server then compares the solution generated by the solution generating means of the server and the solution received from the client and authenticates the client if the solutions agree with each other. As described above, the solution generating means of the server and the client can generate successive identical solutions at least under the common conditions. Thus, as long as the conditions for generating the solutions are shared between the server and the client or between the solution generating means of the server and the solution generating means of the client, the solution generating means of the server and the solution generating means of the client can generate identical solutions, in other words, the generated solutions can be synchronized with each other.

In the present invention, if the solutions are synchronized with each other, the client is authenticated.

The client can authenticate the server by the server certificate and the SSL certificate as in the conventional SSL communications. The server and the client include the solution generating means having simple configurations, and the server is also allowed to authenticate the client. Thus, SSL communications are improved to enable interactive authentication between the server and the client. Additionally, the conditions for generating the solutions by the server and the client are basically unknown to a malicious third party. Thus, encrypted communications according to SSL communications in the present application are safer than conventional communications.

The present invention can be also perceived as a communication method performed by the client. The communication method has the above mentioned effect.

The method is, for example, an SSL communication method implemented by the client of an SSL communication system including a server and the client. The server is connectable to a predetermined network and includes a private key, a server certificate for proving the authenticity of the server with a digital signature including a public key paired with the private key, an SSL certificate for proving the authenticity of the digital signature attached to the server certificate, and solution generating means capable of successively generating solutions. The client is connectable to the predetermined network and includes an SSL certificate for proving the authenticity of the digital signature attached to the server certificate and solution generating means capable of successively generating solutions identical to those of the solution generating means of the server under common conditions.

The communication method implemented by the client includes the steps of:

generating the solution by the solution generating means and transmitting the solution to the server via the network; receiving the server certificate and the SSL certificate of the server from server via the network, when the server received the solution from the client via the network, generated the solution by the solution generating means of the server under the same conditions as the solution generated by the solution generating means of the client, compared the solution generated by the solution generating means of the server and the solution received from the client, and authenticated the client if the solutions agree with each other, transmitted the server certificate and the SSL certificate to the client if the server authenticated the client; verifying the authenticity of the server certificate transmitted from the server, by using the SSL certificate transmitted from the server and the SSL certificate of the client; encrypting, if the server certificate is authenticated, the common key of the client by using the public key included in the server certificate; transmitting the encrypted common key to the server via the network; and performing encrypted communications with the server in the common key system by using the common key shared between the server and the client, and the common key be had by the server is the common key which was transmitted from the client in encrypted manner and was got by decrypting the encrypted common key with the private key of the server.

The present invention can be also perceived as a communication method performed by the server. The communication method has the above mentioned effect.

The method is, for example, an SSL communication method implemented by the server of an SSL communication system including a server and the client. The server is connectable to a predetermined network and includes a private key, a server certificate for proving the authenticity of the server with a digital signature including a public key paired with the private key, an SSL certificate for proving the authenticity of the digital signature attached to the server certificate, and solution generating means capable of successively generating solutions. The client is connectable to the predetermined network and includes an SSL certificate for proving the authenticity of the digital signature attached to the server certificate and solution generating means capable of successively generating solutions identical to those of the solution generating means of the server under common conditions.

The communication method implemented by the server includes the steps of:

receiving the solution which was generated by the solution generating means of the client and was transmitted from the client via the network; generating the solution by the solution generating means of the server under the same conditions as the solution generated by the solution generating means of the client, comparing the solution generated by the solution generating means of the server and the solution received from the client, and authenticating the client if the solutions agree with each other; transmitting the server certificate and the SSL certificate of the server to the client via the network if the server authenticates the client; receiving a common key in the encrypted manner which is transmitted from the client via the network, when the client received the server certificate and the SSL certificate from the server via the network, encrypted the common key of the client by using the public key included in the server certificate if the server certificate transmitted from the server was authenticated by using the SSL certificate transmitted from the server and the SSL certificate of the client; decrypting the encrypted common key with the private key of the server; and performing encrypted communications with the client in the common key system by using the common key shared between the server and the client in the above-mentioned steps.

The present invention can be also perceived as a client that is connectable to a network so as to constitute an encrypted communication system in combination with a server. The client has the above mentioned effect.

The client is, for example, a client connectable to a predetermined network so as to constitute an SSL encrypted communication system in combination with a server connectable to the predetermined network including a private key, a server certificate for proving the authenticity of the server with a digital signature including a public key paired with the private key, an SSL certificate for proving the authenticity of the digital signature attached to the server certificate, solution generating means capable of successively generating solutions, private-key decryption means capable of decrypting, with the private key, data encrypted by the public key, and server second encryption/decryption means capable of encryption and decryption in the common key system with a common key.

The client includes: an SSL certificate for proving the authenticity of the digital signature attached to the server certificate: client solution generating means capable of successively generating solutions identical to solutions generated by the server solution generating means under common conditions; client authentication means capable of verifying the authenticity of the server certificate transmitted from the server, by using the SSL certificate transmitted from the server and the SSL certificate of the client; public-key encryption means capable of encryption using the public key, and client second encryption/decryption means capable of encryption and decryption in the common key system with the common key.

The client is arranged to generates the solution by the client solution generating means and to transmit the solution to the server via the network. The server receives the solution from the client via the network, generates the solution by the server solution generating means under the same conditions as the solution generated by the client solution generating means, compares the solution generated by the server solution generating means and the solution received from the client, authenticates the client if the solutions agree with each other, and receives the server certificate and the SSL certificate of the server in the transmission of the server certificate and the SSL certificate to the client via the network if the server authenticates the client. The public-key encryption means is arranged to encrypt the common key of the client and the client is arranged to transmit the encrypted common key to the server via the network if the server certificate transmitted from the server is authenticated by the client authentication means by using the SSL certificate transmitted from the server and the SSL certificate of the client. The server decrypts the encrypted and received common key by the private-key decryption means with the private key, the server second encryption/decryption means encrypts and decrypts, and by using the common key shared between the server and the client in the above-mentioned steps, data to be transmitted and received, and the client second encryption/decryption means encrypts and decrypts data to be transmitted and received, enabling encrypted communications with the server in the common key system.

Such a client can be perceived as follows.

In this case, the server includes server first encryption/decryption means capable of encryption using the solution generated by the server solution generating means, generates the second or subsequent solution by the server solution generating means under predetermined conditions before transmitting the server certificate and the SSL certificate of the server to the client via the network, encrypts the server certificate and the SSL certificate by the server first encryption/decryption means by using the solution generated by the server solution generating means, and transmits the encrypted server certificate and SSL certificate to the client to the client.

The client used in combination with the server includes client first encryption/decryption means capable of decrypting data encrypted by the server first encryption/decryption means, by using the solution generated by the client solution generating means if the same solution is used. The client solution generating means is arranged to generate, if the client receives the encrypted server certificate and SSL certificate, the second or subsequent solution under the same conditions as the solution generated by the server solution generating means so as to be used for encrypting the server certificate and the SSL certificate in the server. The client first encryption/decryption means is arranged to decrypt the encrypted server certificate and SSL certificate by using the second or subsequent solution generated by the client solution generating means.

In this case, the server certificate and the SSL certificate are transmitted from the server to the client in an encrypted state. This reduces the probability of wiretapping by a third party in encrypted communications performed using the server and the client. The theory will be discussed below.

In this case, the server includes server first encryption/decryption means capable of encryption using the solution generated by the server solution generating means. Moreover, if the server authentication means authenticates the client, the server generates the second or subsequent solution by the server solution generating means of the server under the predetermined conditions. The server first encryption/decryption unit means encrypts the server certificate and the SSL certificate by using the solution.

In this case, the client includes client first encryption/decryption means capable of decrypting data encrypted by the server first encryption/decryption means by using the client solution generating means if the same solution is used. When the client receives the encrypted server certificate and SSL certificate from the server, the client solution generating means generates the second or subsequent solution under the same conditions as the solution generated by the server solution generating means so as to be used for encrypting the server certificate and the SSL certificate in the server. Subsequently, the client first encryption/decryption means decrypts the encrypted server certificate and SSL certificate by using the generated solution.

As described above, the solution is generated by the client solution generating means under the same conditions as the solution generated by the server solution generating means in order to encrypt the server certificate and the SSL certificate. Thus, the solution generated by the server solution generating means in order to encrypt the server certificate and the SSL certificate is identical to the solution generated by the client solution generating means in order to decrypt the server certificate and the SSL certificate that are encrypted by the client first encryption/decryption means. The client first encryption/decryption means can decrypt, if the same solution is used, data encrypted by the server first encryption/decryption means. Thus, the client first encryption/decryption means can decrypt the encrypted server certificate and SSL certificate because the used solution is identical to the encrypted solution. The decryption is ensured unless an interference of a third party occurs.

The encryption by the server first encryption/decryption means in the server and the decryption by the client first encryption/decryption means in the client have different results depending on the solutions. In other words, the encryption and the decryption have solution dependence.

Thus, if a third party intends to know the contents of the server certificate and the SSL certificate that are transmitted on the network in an encrypted state, the third party has to know the contents of the solutions. However, as described above, the solutions used for encryption and decryption are provided only in the server or the client without being transmitted on the network. Thus, a malicious third party cannot know the solutions used for encryption and decryption and thus fails to reach the contents of the server certificate and the SSL certificate that are transmitted on the network in an encrypted state. In conventional SSL communications, typical tampering of a server certificate and an SSL certificate by a malicious third party is to steal the server certificate and the SSL certificate during transmission. In order to prevent tampering, encrypted communications according to the invention can have quite high resistance.

As described above, in the invention, the encryption by the server first encryption/decryption means in the server and the decryption by the client first encryption/decryption means in the client depend on the solutions. In order to provide the solution dependence for the encryption and decryption, the solutions can be also used as, for example, keys for encryption and decryption.

In the present invention, the server and the client may initially determine the conditions for generating solutions (for example, which one of the solutions) used for the encryption and decryption of the server certificate and the SSL certificate after the solution transmitted from the client to the server. For example, the solutions generated in the server and the client may be used next to the solution transmitted from the client to the server or the fifth solution may be used. The solution to be used can be determined in advance between the server and the client. Alternatively, multiple common solutions can be used for encryption and decryption, thereby reducing the probability of stealing of the server certificate and the client certificate by a third party.

If the server certificate and the SSL certificate are transmitted from the server to the client in an encrypted state, the server certificate in plain text can be also transmitted from the server to the client.

In this case, the server transmits the server certificate encrypted by the server first encryption/decryption means to the client and transmits the server certificate in plain text to the client. In this case the client authentication means may be arranged to verify whether the server certificate transmitted from the server is authorized or not, only if the server certificate decrypted by the client first encryption/decryption means and the server certificate transmitted from the server without being encrypted are identical to each other. Without an attack from a third party, the server certificate that is encrypted and transmitted from the server to the client always agrees with the server certificate transmitted from the server to the client without being encrypted. The client authentication means authenticates the server certificates only if the server certificates agree with each other, so that the client can authenticate only the server certificate that is not tampered by a third party. In this case, the client authentication means may authenticate the server certificate only if the SSL certificate in plain text is transmitted from the server to the client in addition to the server certificate in plain text and the server certificates and SSL certificates encrypted and transmitted from the server to the client all agree with the server certificates and SSL certificates transmitted from the server to the client without being encrypted.

The present invention can be also perceived as a server that is connectable to a predetermined network so as to constitute an encrypted communication system in combination with a client. The server has the above mentioned effect.

The server includes, for example, a server certificate for proving the authenticity of the server attached with a digital signature including a private key and a public key paired with the private key, an SSL certificate for proving the authenticity of the digital signature attached to the server certificate, server solution generating means capable of successively generating solutions, private-key decryption means capable of decrypting, with the private key, data encrypted with the public key, and server second encryption/decryption means capable of encryption and decryption in a common key system with a common key, the server being connectable to the network so as to constitute an SSL encryption/decryption communication system in combination with a client connectable to the network, the client including: an SSL certificate for proving the authenticity of a digital signature attached to the server certificate, client solution generating means capable of successively generating solutions identical to solutions generated by the server solution generating means under common conditions, client authentication means capable of verifying whether the server certificate transmitted from the server is authorized or not by using the SSL certificate transmitted from the server and the SSL certificate of the client, public-key encryption means capable of encryption using the public key, and client second encryption/decryption means capable of encryption and decryption in the common key system with the common key.

The server further includes server authentication means for authenticating the client. The client generates the solution by the client solution generating means and transmits the solution to the server via the network. The server solution generating means is arranged to generate the solution under the same conditions as the solution generated by the client solution generating means, when the server receives the solution from the client via the network. The server authentication means is arranged to compare the solution generated by the server solution generating means and the solution received from the client and to authenticate the client if the solutions agree with each other. The server is arranged to transmit the server certificate and the SSL certificate of the server to the client via the network if the server authentication means authenticates the client. The client receives the server certificate and the SSL certificate and determines, by using the SSL certificate transmitted from the server and the SSL certificate of the client, whether the server certificate transmitted from the server is authorized or not by the client authentication means. If the server certificate is authenticated, the common key of the client is encrypted by the public-key encryption means and then the encrypted common key is transmitted to the server via the network. The server is arranged to decrypt the encrypted and received common key with the private key by means of the private-key decryption means. The server second encryption/decryption means encrypts and decrypts, by using the common key shared between the server and the client in the above-mentioned steps, data to be transmitted and received, and the client second encryption/decryption means encrypts and decrypts data to be transmitted and received, enabling encrypted communications with the client in the common key system.

Such a server can be perceived as follows.

In this case, the server includes server first encryption/decryption means capable of encryption and decryption using the solution generated by the server solution generating means. The server is arranged to generate the second or subsequent solution by means of the server solution generating means under predetermined conditions before transmitting the server certificate and the SSL certificate of the server to the client via the network, to encrypt the server certificate and the SSL certificate by means of the server first encryption/decryption means by using the solution generated by the server solution generating means, and to transmit the encrypted server certificate and SSL certificate to the client.

The server is used in combination with the client including client first encryption/decryption means capable of decrypting data encrypted by the server first encryption/decryption means, by using the solution generated by the client solution generating means if the same solution is used. The client solution generating means generates, if the client receives the encrypted server certificate and SSL certificate, the second or subsequent solution under the same conditions as the solution generated by the server solution generating means so as to be used for encrypting the server certificate and the SSL certificate in the server. The client first encryption/decryption means decrypts the encrypted server certificate and SSL certificate by using the second or subsequent solution generated by the client solution generating means.

The server is used when the encrypted server certificate and SSL certificate are transmitted from the server to the client. The effect of the server has been already discussed.

In this case, the server may be arranged to transmit the server certificate encrypted by the server first encryption/decryption means to the client and to transmit the server certificate in plain text to the client. In this case, the client authentication means of the client may verify whether the server certificate transmitted from the server is authorized or not, only if the server certificate decrypted by the client first encryption/decryption means and the server certificate transmitted from the server without being encrypted are identical to each other This corresponds to the transmission of the server certificate in plain text from the server to the client in addition to the transmission of the encrypted server certificate and the SSL certificate. The effect of the transmission has been already discussed.

The present invention can be also perceived as a computer program for enabling a general purpose computer to act as the client of the present invention. The computer program has above mentioned effect.

The computer program is, for example, a computer program for enabling a computer to act as the client of an encrypted communication system including: a server connectable to a predetermined network, the server including a private key, a server certificate for proving the authenticity of the server with a digital signature including a public key paired with the private key, an SSL certificate for proving the authenticity of the digital signature attached to the server certificate, and solution generating means capable of successively generating solutions, and the client connectable to the predetermined network, the client including an SSL certificate for proving the authenticity of the digital signature attached to the server certificate and solution generating means capable of successively generating solutions identical to the solution generated by the solution generating means of the server under common conditions.

The computer program enables the computer to perform the steps of:

generating the solution by the solution generating means and transmitting the solution to the server via the network; receiving the server certificate and the SSL certificate of the server from server via the network, when the server received the solution from the client via the network, generated the solution by the solution generating means of the server under the same conditions as the solution generated by the solution generating means of the client, compared the solution generated by the solution generating means of the server and the solution received from the client, and authenticated the client if the solutions agree with each other, transmitted the server certificate and the SSL certificate to the client if the server authenticated the client; verifying the authenticity of the server certificate transmitted from the server, by using the SSL certificate transmitted from the server and the SSL certificate of the client; encrypting, if the server certificate is authenticated, the common key of the client by using the public key included in the server certificate; transmitting the performing encrypted communications with the server in the common key system by using the common key shared between the server and the client, and the common key be had by the server is the common key which was transmitted from the client in encrypted manner and was got by decrypting the encrypted common key with the private key of the server.

The present invention can be perceived as a computer program for enabling a general purpose computer to act as the server of the present invention. The computer program has the above mentioned effect.

The computer program is, for example, a computer program for enabling a computer to act as the server of an encrypted communication system including the server connectable to a predetermined network, the server including a private key, a server certificate for proving the authenticity of the server with a digital signature including a public key paired with the private key, an SSL certificate for proving the authenticity of the digital signature attached to the server certificate, and solution generating means capable of successively generating solutions, and the client connectable to the predetermined network, the client including an SSL certificate for proving the authenticity of the digital signature attached to the server certificate and solution generating means capable of successively generating solutions identical to the solution generated by the solution generating means of the server under common conditions.

The computer program enables the computer to perform the steps of:

receiving the solution which was generated by the solution generating means of the client and was transmitted from the client via the network; generating the solution by the solution generating means of the server under the same conditions as the solution generated by the solution generating means of the client, comparing the solution generated by the solution generating means of the server and the solution received from the client, and authenticating the client if the solutions agree with each other; transmitting the server certificate and the SSL certificate of the server to the client via the network if the server authenticates the client; receiving a common key in the encrypted manner which is transmitted from the client via the network, when the client received the server certificate and the SSL certificate from the server via the network, encrypted the common key of the client by using the public key included in the server certificate if the server certificate transmitted from the server was authenticated by using the SSL certificate transmitted from the server and the SSL certificate of the client; decrypting the encrypted common key with the private key of the server; and performing encrypted communications with the client in the common key system by using the common key shared between the server and the client in the above-mentioned steps.

According to the computer program for enabling a computer to act as the client of the present invention, on the computer constituting the client, encryption and decryption in encrypted communications in the common key system are performed between a TCP/IP and a predetermined application for handling plaintext data to be encrypted on the computer, and a plain text to be encrypted and transmitted to the server is generated by the application and is transmitted to the TCP/IP, and encrypted data from the server is transmitted from the TCP/IP and is decrypted into a plain text to be transmitted to the application.

A computer program in current SSL communications performs encryption and decryption between an application and TCP/IP. The above-mentioned computer program can easily substitute for a computer program for current SSL communications.

According to the computer program for enabling a computer to act as the server of the present invention, on the computer constituting the server, encryption and decryption in encrypted communications in the common key system are performed between a TCP/IP and a predetermined application for handling plaintext data to be encrypted on the computer, and a plain text to be encrypted and transmitted to the client is generated by the application and is transmitted to the TCP/IP, and encrypted data from the client is transmitted from the TCP/IP and is decrypted into a plain text to be transmitted to the application.

Thus, the computer program of the present invention can easily substitute for a computer program for current SSL communications.

DESCRIPTION OF EMBODIMENTS

First to third embodiments according to the present invention will be described below. The same elements in the

First Embodiment

Figure 1:
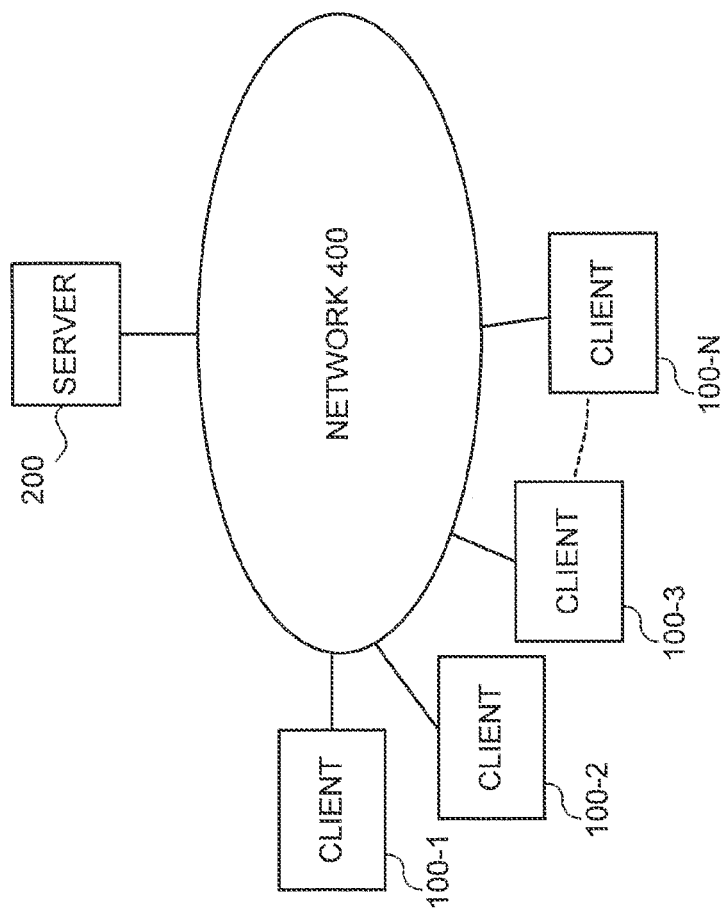
FIG. 1 shows the overall configuration of an SSL communication system according to a first embodiment.

FIG. 1 is a schematic diagram showing the overall configuration of an SSL communication system according to a first embodiment.

The SSL communication system includes a plurality of clients 100-1 to 100-N (hereinafter may be simply referred to as "client 100") and a server 200. The clients and the server are all connectable to a network 400.

The network 400 is the Internet in the present embodiment but is not limited thereto.

The client 100 includes a computer, or is constituted by a general purpose computer.

The configuration of the client 100 will be described below. The clients 100-1 to 100-N are identical in configuration in association with the present invention.

The client 100 is, for example, a mobile phone, a smartphone, a tablet, a laptop computer, or a desktop computer. The clients can communicate with one another via the network 400. It is necessary to generate a functional block, which will be discussed later, in each of the clients by installing a computer program that will be discussed later, and execute processing as will be discussed later. Other specifications are negligible as long as the functional block and the processing are implemented.

For example, if the client 100 is a smartphone or a tablet, a smartphone acting as the client 100 may be an iPhone manufactured and sold by Apple Japan, Inc. and a tablet acting as the client 100 may be an iPad manufactured and sold by Apple Japan, Inc. The client 100 is not limited to a smartphone or a tablet. Hereinafter the client 100 is a smartphone.

Figure 2:
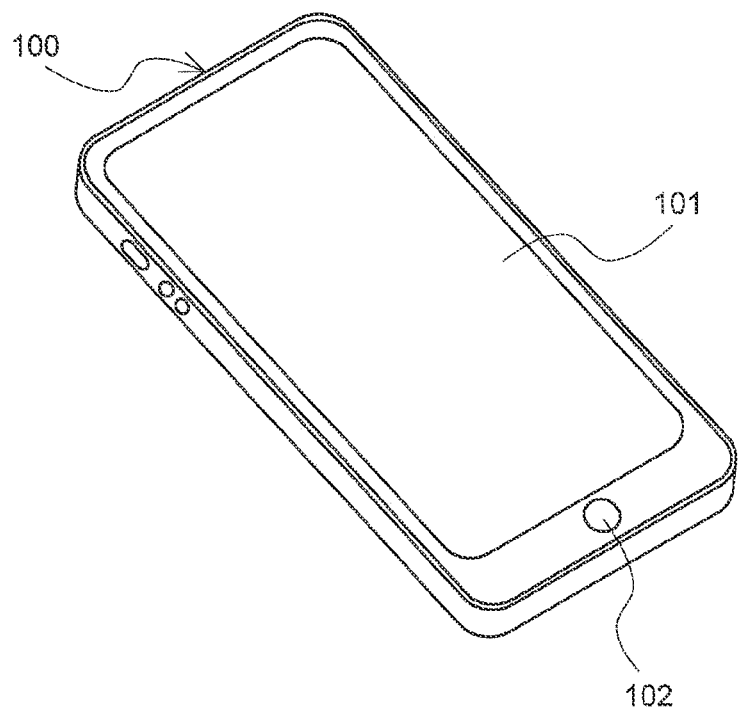
FIG. 2 shows the external appearance of a client included in the SSL communication system shown in FIG. 1.

FIG. 2 shows an example of the external appearance of the client 100.

The client 100 has a display 101. The display 101 is provided to display a static image or a moving image and can be a publicly or widely known display. The display 101 is, for example, a liquid crystal display. The client 100 further includes an input device 102. The input device 102 is provided to enable a desired input of a user to the client 100. The input device 102 can be a publicly or widely known input device. The input device 102 of the client 100 in the present embodiment is a button type but is not limited thereto. The input device 102 can be a ten key, a keyboard, a trackball, or a mouse. If the client 100 is, in particular, a laptop computer or a desktop computer, the input device 102 is a keyboard or a mouse. If the display 101 is a touch panel, the display 101 also acts as the input device 102 in the present embodiment.

Figure 3:
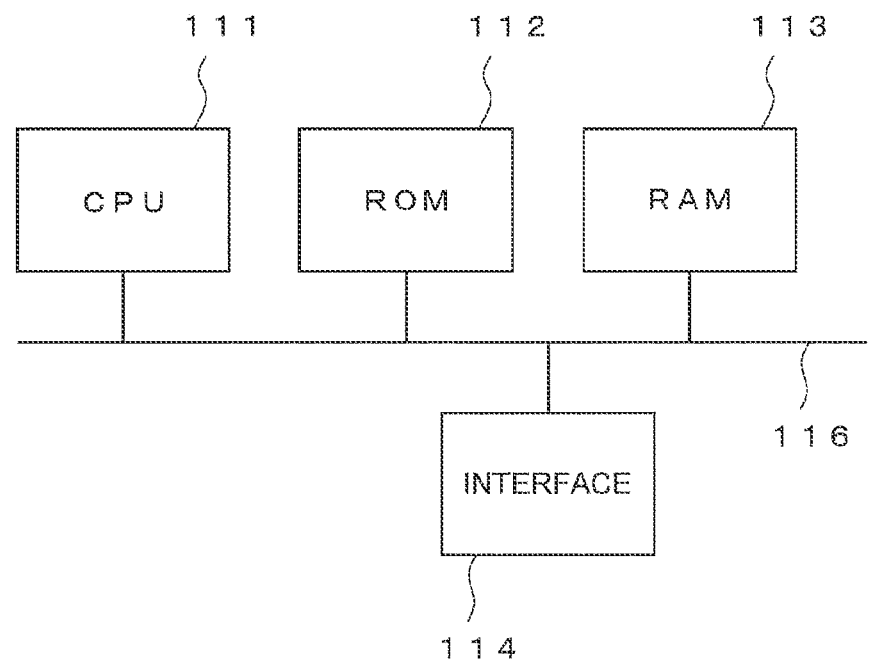
FIG. 3 shows the hardware configuration of the client included in the SSL communication system shown in FIG. 1.

FIG. 3 shows the hardware configuration of the client 100. Hardware includes a CPU (central processing unit) 111, a ROM (read only memory) 112, a RAM (random access memory) 113, and an interface 114, which are connected to one another via a bus 116.

The CPU 111 is an arithmetic unit for performing an operation. The CPU 111 executes computer programs recorded in the ROM 112 or the RAM 113, thereby executing processing as will be discussed later. The hardware may include an HDD (hard disk drive) and other large-capacity recorders, though not illustrated. The computer programs may be recorded in the large-capacity recorders.

The computer programs in the present embodiment include at least a computer program for enabling the client 100 to act as a client of the present invention. The computer program may be preinstalled or installed later in the client 100. The computer program may be installed in the client 100 via a predetermined recording medium, e.g., a memory card or via a network such as a LAN or the Internet.

The ROM 112 records computer programs and data for enabling the CPU 111 to execute processing as will be discussed later. Computer programs recorded in the ROM 112 are not limited to the above computer programs. If the client 100 is a smartphone, computer programs and data for enabling the client 100 to act as a smartphone are recorded. For example, computer programs and data for implementing telephone calls and e-mails are recorded. The client 100 can view web sites based on data received via the network 400. A publicly known web browser for viewing web sites is installed on the client 100.

The RAM 113 provides a workspace for the processing of the CPU 111.

The interface 114 transfers data between the CPU 111 and the RAM 113, which are connected via the bus 116, and the outside. The interface 114 is connected to the display 101 and the input device 102. The operation contents inputted from the input device 102 are inputted from the interface 114 to the bus 116. As is commonly known, image data for displaying an image on the display 101 is outputted from the interface 114 to the display 101. The interface 114 is connected to a transmit/receive mechanism (not shown) that is known means for communicating with the outside via the network 400, that is, the Internet. This configuration allows the client 100 to transmit data via the network 400 and receive data via the network 400. Data may be transmitted and received via the network 400 through wire or wireless communications. For example, if the client 100 is a smartphone, wireless communications are typically performed. As long as such communications are possible, the transmit/receive mechanism can have a publicly or widely known configuration. Data received by the transmit/receive mechanism from the network 400 is received by the interface 114. Data transferred from the interface 114 to the transmit/receive mechanism is transmitted by the transmit/receive mechanism to the outside, for example, the server 200 via the network 400.

Figure 4:
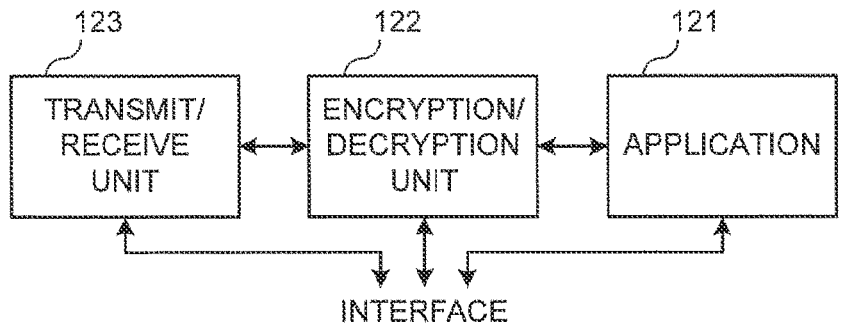
FIG. 4 is a block diagram showing functional blocks generated in the client included in the SSL communication system shown in FIG. 1.

The CPU 111 executes the computer programs so as to generate a functional block in the client 100 as shown in FIG. 4. The functional block discussed below may be generated only by the functions of the computer programs for causing the client 100 to act as a client of the present invention. Alternatively, the functional block may be generated by cooperation between the computer programs and an OS and other computer programs that are installed on the client 100.

In the client 100, an application 121, an encryption/decryption unit 122, and a transmit/receive unit 123 are generated in association with the functions of the present invention.

The application 121 is, for example, publicly known browser software or e-mail software and the transmit/receive unit 123 is software for transmitting and receiving data via the network 400. The application 121 and the transmit/receive unit 123 are not generated by the functions of the computer programs of the present invention.

The application 121 generates plaintext data to be encrypted and transmitted from the client 100 to the server 200 and decrypts data that is encrypted and transmitted from the server 200 to the client 100 for use. In consideration of this function, the application 121 is not limited to the above example. The application 121 is connected to the interface 114 and operates according to data on operation contents received from the input device 102 via the interface 114. As a result of the operation, the application 121 generates plaintext data to be encrypted and transmitted to the server 200 via the network 400. The data is transmitted to the encryption/decryption unit 122. The application 121 also generates, for example, the image data as a result of the operation. The image data is transmitted to the interface 114 and then is transmitted therefrom to the display 101.

The transmit/receive unit 123 is a functional block that transmits and receives data to and from the server 200 or the like via the network 400. The transmit/receive unit 123 has publicly and widely known functions, for example, determination of a destination address and writing of predetermined contents in data to be transmitted. The transmit/receive unit 123 can perform communications using at least TCP/IP via the network 400. Data received by the transmit/receive mechanism from the network 400 is received by the transmit/receive unit 123 via the interface 114. The transmit/receive unit 123 transmits, to the encryption/decryption unit 122, data received from the transmit/receive mechanism via the interface 114. Moreover, the transmit/receive unit 123 may receive data from the encryption/decryption unit 122. The transmit/receive unit 123 transmits, to the interface 114, data received from the encryption/decryption unit 122 and then transmits the data from the transmit/receive mechanism to the server 200 via the network 400.

To put it simply, the encryption/decryption unit 122 has the functions of optionally decrypting data received from the transmit/receive unit 123 and optionally encrypting data received from the application 121, and performs necessary processing for the mutual authentication of the client 100 with the server 200. In other words, the encryption/decryption unit 122 plays a key role in encrypted communications between the client 100 and the server 200 according to the present invention and is generated in the client 100 by the computer program for enabling the computer of the present invention to act as a client.

Moreover, the encryption/decryption unit 122 may receive data on operation contents inputted from the input device 102, via the interface 114.

Figure 5:
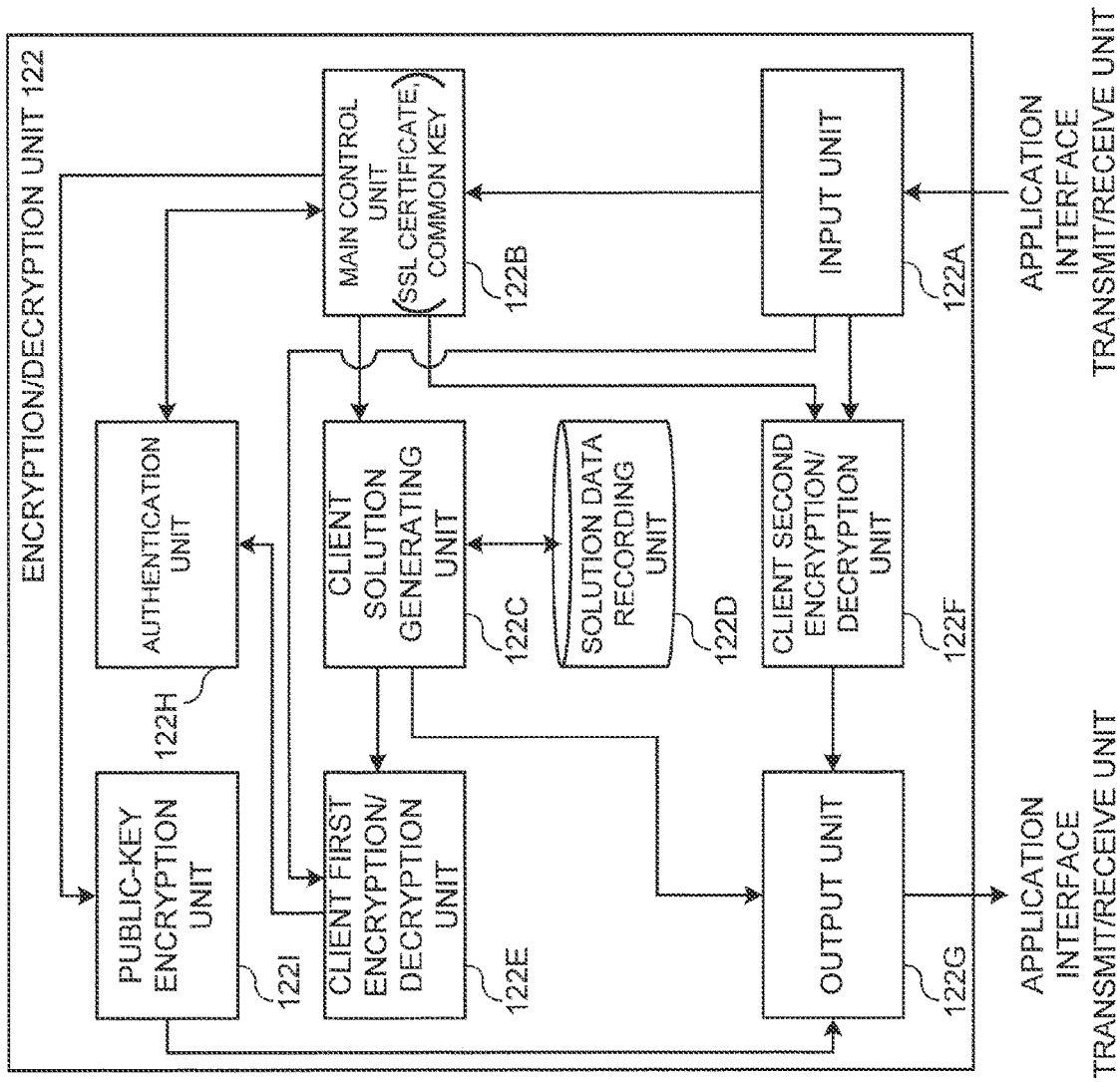
FIG. 5 is a block diagram showing functional blocks generated in an encryption/decryption unit shown in FIG. 4.

An input unit 122A, a main control unit 122B, a client solution generating unit 122C, a solution data recording unit 122D, a client first encryption/decryption unit 122E, a client second encryption/decryption unit 122F, an output unit 122G, an authentication unit 122H, and a public-key encryption unit 122I are generated in the encryption/decryption unit 122 (FIG. 5).

The input unit 122A receives data from the interface 114 or the application 121. If data on operation contents is inputted from the input device 102 via the interface 114, the input unit 122A transmits the data to the main control unit 122B. As will be discussed later, the input unit 122A may receive encrypted data from the server 200 via the interface 114 and the transmit/receive unit 123, the data being encrypted with a common key. When receiving the data, the input unit 122A transfers the data to the client second encryption/decryption unit 122F. As will be discussed later, the input unit 122A may receive data on encrypted server certificate and SSL certificate from the server 200 via the interface 114 and the transmit/receive unit 123. When receiving the data, the input unit 122A transmits the data to the client first encryption/decryption unit 122E. The input unit 122A may further receive data transmitted from the application 121. As will be discussed later, the data is intended to be transmitted to the server 200 after being encrypted. When receiving the data, the input unit 122A transmits the data to the client second encryption/decryption unit 122F.

The main control unit 122B controls the overall encryption/decryption unit 122. As described above, the main control unit 122B may receive data on operation contents from the input unit 122A. When receiving the data, the main control unit 122B optionally sends an instruction based on the data to a functional block in the encryption/decryption unit 122. When receiving data, for example, the main control unit 122B sends the client solution generating unit 122C an instruction to generate a solution.

Moreover, the main control unit 122B holds a preinstalled SSL certificate. The SSL certificate may be a conventional certificate that describes information on a certification authority, includes the embedded public key of the certification authority, and is attached with the digital signature of the certification authority having issued the SSL certificate (the digital signature of a route certification authority if the SSL certificate is a route certificate), the digital signature being attached to prove the authenticity of the SSL certificate. The SSL certificate is transmitted to the authentication unit 122H at a timing that will be discussed later. The SSL certificate is preinstalled on an application (e.g., a browser) or is installed on an application by each user. The main control unit 122B may include multiple SSL certificates as in conventional SSL communications.

Furthermore, the main control unit 122B can generate the common key. The common key is generated by the main control unit 122B when necessary. The common key can be generated by the main control unit 122B according to a publicly or widely known technique. The main control unit 122B transmits the generated common key to the public-key encryption unit 122I. The main control unit 122B in the present embodiment may receive the public key from the authentication unit 122H as will be discussed later. The main control unit 122B having received the public key transmits the common key with the public key to the public-key encryption unit 122I. Instead of generating the common key when necessary, the main control unit 122B may have a fixed common key and transmit the common key to the public-key encryption unit 122I when necessary.

The client solution generating unit 122C can successively generate solutions. The solutions are at least one list of numbers, characters, and symbols. As will be discussed later, the server 200 includes a server solution generating unit configured to successively generate solutions. In a comparison between a solution generated by the server solution generating unit and a solution generated by the client solution generating unit 122C, the solutions generated under common conditions always agree with each other. To put it simply, the client solution generating unit 122C and the server solution generating unit are synchronized with each other or a solution generated by the client solution generating unit 122C and a solution generated by the server solution generating unit are synchronized with each other. Solutions may be generated by any method in the client solution generating unit 122C and the server solution generating unit as long as the synchronization is achieved.

As has been discussed, solutions may be generated by any method in the client solution generating unit 122C and the server solution generating unit as long as the foregoing conditions are satisfied. Such techniques have been completed and practically used as techniques of generating one-time passwords. Such techniques are applicable to the client solution generating unit 122C and the server solution generating unit. More specifically, in the client solution generating unit 122C as well as in the server solution generating unit, a solution is obtained by performing, for example, a predetermined operation on an initial value, a subsequent solution is obtained by performing the predetermined operation again on the solution, and then a subsequent solution is obtained by performing the predetermined operation again on the solution. This processing is repeated so as to successively generate solutions. Such a technique is known as a technique for generating pseudorandom numbers.

A more specific method for generating solutions will be described below.

In order to generate solutions, an initial value (at least two values may be used as shown in (a) and (c) below) is used and past values are substituted for predetermined functions so as to sequentially generate new values. This method is performed each time a solution is necessary. Thus, the solutions can be successively generated. In this case, the solutions are pseudorandom numbers dependent on the initial value.

Examples of the functions used for generating the solutions are shown in (a) to (c) below. Equations in (a) to (c) are all formulated to generate $X_N$, the N-th solution. P, Q, R, and S are natural numbers.

$$(X_N)=(X_{N-1})^P+(X_{N-2})^Q \qquad (a)$$

$$(X^N)=(X_{N-1})^P \qquad (b)$$

$$(X_N)=(X_{N-1})^P(X_{N-2})^Q(X_{N-3})^R(X_{N-4})^S \qquad (c)$$

In (a), two past solutions are used. The solutions are multiplied by P and Q, respectively, and are summed into a new solution. To be precise, the two past solutions multiplied by P and Q, respectively, are typically summed into a solution having a larger number of digits. Thus, a new solution is actually generated by extracting, for example, a proper number of digits from the head of an obtained value, a proper number of digits from the tail of the value, or a proper number of digits from a proper portion of the value.

In (b), a past solution is used. The solution is multiplied by P into a new solution. The number of digits is adjusted as described above.

In (c), four past solutions are used. The solutions are multiplied by P, Q, R, and S, respectively, into a new solution. The number of digits is adjusted as described above.

The above-mentioned (a) to (c) indicate examples of algorithms for generating solutions. The algorithms can be changed in the generation of the solutions. For example, (a) to (c) can be sequentially used in a different way. The solutions with time dependency can be changed with time.

In any event, the server solution generating unit of the server 200 and the client solution generating unit 122C are configured to synchronize solutions in the above-mentioned manner.

The client solution generating unit 122C of the present embodiment generates solutions according to the algorithm of (a). The algorithm is not particularly limited. In this case, an initial value or a past solution is necessary for generating a new solution. An initial value is recorded in the solution data recording unit 122D. Each time the client solution generating unit 122C generates a new solution, the initial value is overwritten with the new solution. The new solution is then overwritten with another new solution. In this way, an initial value or a solution is recorded in the solution data recording unit 122D. Each time the client solution generating unit 122C generates a new solution, the new solution is read from the solution data recording unit 122D.

When a solution is generated, the client solution generating unit 122C transmits the solution to the client first encryption/decryption unit 122E or the output unit 122G.

The client first encryption/decryption unit 122E is configured to perform encryption and decryption. As will be discussed later, the present embodiment is sufficiently implemented as long as at least decryption is performed. The client first encryption/decryption unit 122E can decrypt at least data encrypted by the server first encryption/decryption unit of the server 200. The server first encryption/decryption unit will be discussed later. Solutions are used for encryption and decryption by the client first encryption/decryption unit 122E. As described above, the solution generated by the client solution generating unit 122C is transmitted from the client solution generating unit 122C to the client first encryption/decryption unit 122E. The solution is used for decryption in the client first encryption/decryption unit 122E. The client first encryption/decryption unit 122E receives data on the encrypted server certificate and SSL certificate from the input unit 122A. As will be discussed later, the data on the server certificate and SSL certificate is transmitted from the server 200. The data is encrypted by the server first encryption/decryption unit of the server 200 as will be discussed later. The client first encryption/decryption unit 122E can decrypt the data on the encrypted server certificate and SSL certificate by using the solution as will be discussed later.

The client first encryption/decryption unit 122E transmits the data on the decrypted server certificate and SSL certificate to the authentication unit 122H.

The authentication unit 122H performs authentication to verify whether the server 200 is authorized or not, in other words, whether the server certificate transmitted from the server 200 is authorized or not. The authentication uses the SSL certificate that is originally provided in the client 100 and is received from the main control unit 122B and the server certificate and the SSL certificate that are originally provided in the server 200 and are received from the client first encryption/decryption unit 122E.

The process of the authentication will be discussed later. In any case, as in the present embodiment, an authentication method can follow a method of authenticating a server certificate by using an SSL certificate in existing SSL communications. Without changing the authentication method, encrypted communications performed in the SSL communication system of the present embodiment can be implemented only by slightly changing SSL communications.

When the server certificate is authorized, the authentication unit 122H extracts the public key included in the server certificate from the server certificate and transmits the public key to the main control unit 122B.

The public-key encryption unit 122I performs encryption using the public key. As described above, the public-key encryption unit 122I receives the public key and the common key from the main control unit 122B. When receiving the keys, the public-key encryption unit 122I encrypts the common key with the public key.

Also in conventional SSL communications, a client encrypts the common key of the client with a public key and transmits the common key to the server. The public-key encryption unit 122I can be implemented using functions in conventional SSL communications.

Furthermore, the public-key encryption unit 122I transmits data on the encrypted common key to the output unit 222G.

The client second encryption/decryption unit 122F performs encryption and decryption. The encryption and decryption are performed using the common key transmitted from the main control unit 122B. The target of encryption is plaintext data transmitted from the application 121 via the input unit 122A. The target of decryption is encrypted data that is transmitted from the server 200 via the network 400, the transmit/receive mechanism, the interface 114, and the input unit 122A.

The encryption and decryption by the client second encryption/decryption unit 122F may be performed in any way as long as the encryption and decryption are performed in a common key system with a common key. For example, the publicly or widely known technique used in the SSL communications of (3) described in Background Art of the present application may be applied to the encryption and decryption. For example, the client second encryption/decryption unit 122F can perform DES cryptography.

The client second encryption/decryption unit 122F encrypts data transmitted from the application 121 and then transmits the data to the output unit 122G. The client second encryption/decryption unit 122F decrypts encrypted data transmitted from the server 200 and then transmits the data to the output unit 122G.

The output unit 122G is configured to output data generated in the encryption/decryption unit 122 to the outside.

The output unit 122G may receive a solution from the client solution generating unit 122C. The output unit 122G may also receive encrypted data from the client second encryption/decryption unit 122F, the data being encrypted by the client second encryption/decryption unit 122F after being transmitted from the application 121. Moreover, the output unit 122G may receive decrypted data from the client second encryption/decryption unit 122F, the data being decrypted by the client second encryption/decryption unit 122F after being transmitted as encrypted data from the server 200.

The output unit 122G transmits the solution and the data encrypted by the client second encryption/decryption unit 122F after being transmitted from the application 121, to the interface 114 via the transmit/receive unit 123. The data transmitted to the interface 114 is transmitted to the server 200 via the transmit/receive mechanism and the network 400. Moreover, the output unit 122G may receive the data on the encrypted common key from the public-key encryption unit 122I. The data on the encrypted common key transmitted from the public-key encryption unit 122I is transmitted to the server 200 like the above-mentioned solutions.

The output unit 122G also transmits, to the application 121, the data decrypted by the client second encryption/decryption unit 122F after being transmitted as encrypted data from the server 200. The data is used in the application 121.

The configuration of the server 200 will be described below.

The server 200 may be a publicly or widely known existing server acting as hardware. The server 200 may have an ordinary hardware configuration. Roughly speaking, the server 200 can follow the hardware configuration of the client 100 in which the CPU 111, the ROM 112, the RAM 113, and the interface 114 are connected via the bus 116. The server 200 typically includes an HDD and other large-capacity recorders.

The configurations and functions of the CPU, the ROM, the RAM, the interface, the bus, and the large-capacity recorders in the server 200 are identical to those in the client 100. Like the transmit/receive mechanism of the client 100, the interface of the server 200 is connected to the transmit/receive mechanism for communicating with an external device of the server 200 via the network 400. The interface of the server 200 may be connected to a display and an input device as in the client 100. The configuration is not closely related to the present application and thus the explanation thereof is omitted.

The execution of computer programs recorded in the ROM and the large-capacity recorders in the server 200 generates a functional block in the server 200 as will be discussed below. The functional block discussed below may be generated only by the function of the computer program for causing the server 200 to act as a server of the present invention. Alternatively, the functional block may be generated by cooperation between the computer program and an OS and other computer programs that are installed on the server 200. The computer programs may be installed on the server 200 via a predetermined recording medium, e.g., a memory card or via a network such as a LAN or the Internet. The circumstances are similar to those of the client 100.

Figure 6:
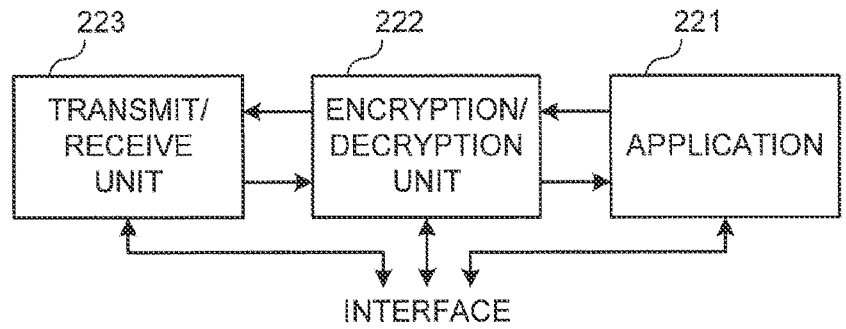
FIG. 6 is a block diagram showing functional blocks generated in a server included in the SSL communication system shown in FIG. 1.

In the server 200, an application 221, an encryption/decryption unit 222, and a transmit/receive unit 223 are generated in association with the functions of the present invention (FIG. 6).

The application 221 is, for example, known software for displaying a desired image on the browser of the client 100 or software for payment in Internet banking based on the decision of a user who operates the client 100. The transmit/receive unit 223 is software for transmitting and receiving data via the network 400. The application 221 and the transmit/receive unit 223 are not generated by the functions of the computer programs of the present invention. The circumstances are similar to those of the client 100.

The application 221 generates plaintext data to be encrypted and transmitted from the server 200 to the client 100 and decrypts encrypted data that is transmitted from the client 100 to the server 200. As long as such an operation is performed, the application 221 is not limited to the above example. The application 221 is connected to the interface and automatically operates according to data on operation contents received from the input device via the interface or a prepared program. As a result of the operation, the application 221 generates plaintext data to be encrypted and transferred to the client 100 via the network 400. The data is transmitted to the encryption/decryption unit 222. The application 221 may also generate, for example, image data as a result of the operation. The image data is transmitted to the interface and then is transmitted to the display (not shown) of the server 200 so as to display an image.

The transmit/receive unit 223 is a functional block that transmits and receives data to and from the client 100 or the like via the network 400. The transmit/receive unit 223 has publicly and widely known functions of, for example, determining a destination address and writing predetermined contents in data to be transmitted. The transmit/receive unit 223 can perform communications using at least TCP/IP via the network 400. Data received by the transmit/receive mechanism from the network 400 is received by the transmit/receive unit 223 via the interface. The transmit/receive unit 223 transmits, to the encryption/decryption unit 222, data received from the transmit/receive mechanism via the interface. Moreover, the transmit/receive unit 223 may receive data from the encryption/decryption unit 222. The transmit/receive unit 223 transmits, to the interface, data received from the encryption/decryption unit 222 and transmits the data from the transmit/receive mechanism to the client 100 via the network 400.

To put it simply, the encryption/decryption unit 222 has the functions of optionally decrypting data received from the transmit/receive unit 223 and optionally encrypting data received from the application 221, and performs necessary processing for the mutual authentication of the client 100 with the server 200. In other words, the encryption/decryption unit 222 plays a key role in encrypted communications between the client 100 and the server 200 according to the present invention and is generated in the server 200 by the computer program for enabling the computer of the present invention to act as a server.

Moreover, the encryption/decryption unit 222 may receive data on operation contents inputted from the input device, via the interface.

Figure 7:
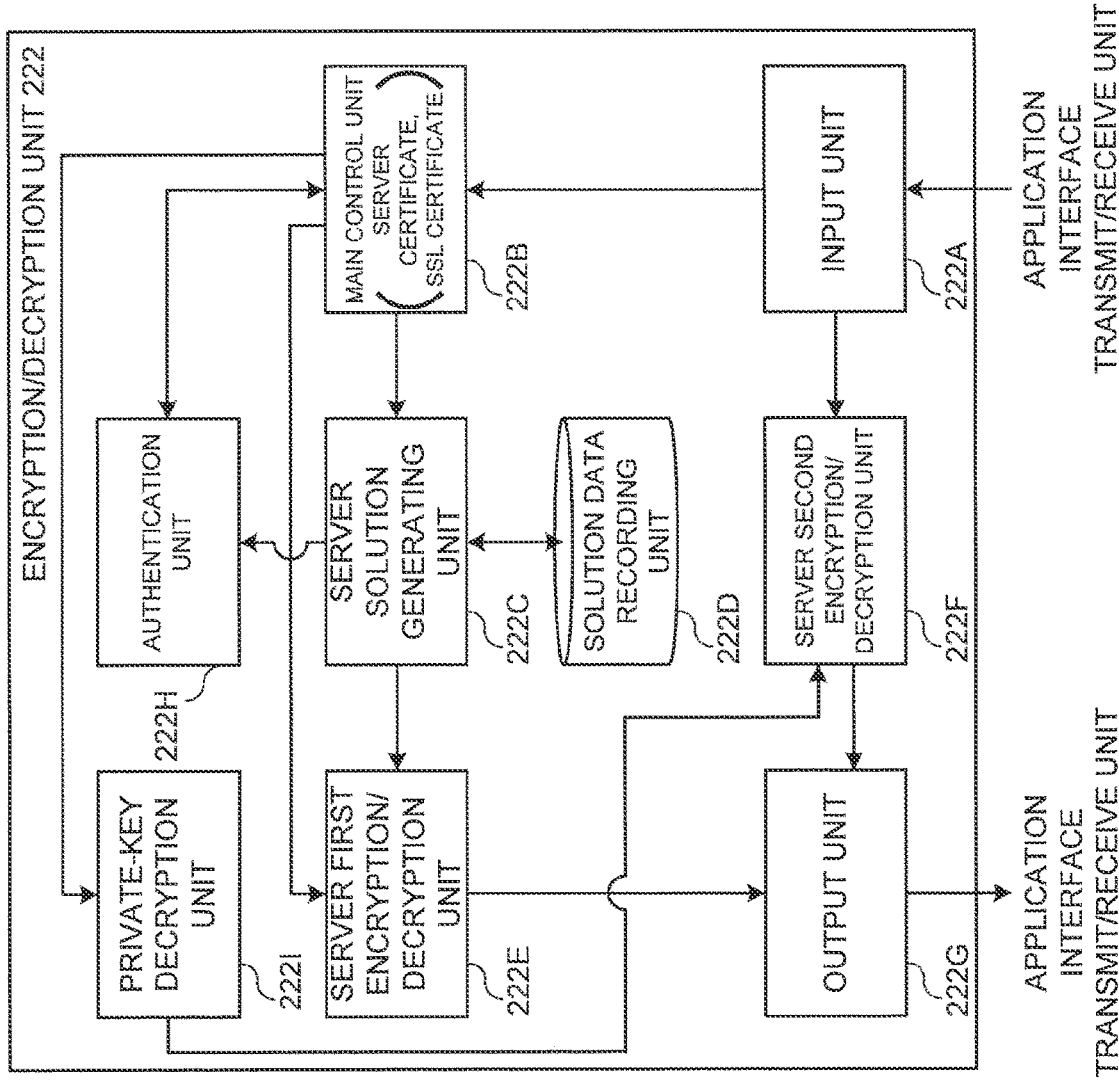
FIG. 7 is a block diagram showing functional blocks generated in the encryption/decryption unit shown in FIG. 6.

An input unit 222A, a main control unit 222B, a server solution generating unit 222C, a solution data recording unit 222D, a server first encryption/decryption unit 222E, a server second encryption/decryption unit 222F, an output unit 222G, an authentication unit 222H, and a private-key decryption unit 222I are generated in the encryption/decryption unit 222 (FIG. 7).

The input unit 222A receives data from the interface or the application 221. As will be discussed later, the input unit 222A may receive encrypted data from the client 100 via the interface and the transmit/receive unit 223, the data being encrypted with a common key. When receiving the data, the input unit 222A transmits the data to the server second encryption/decryption unit 222F. As will be discussed later, data on solutions transmitted from the client 100 may be inputted to the input unit 222A via the interface. When receiving the data, the input unit 222A transmits the data to the main control unit 222B. As will be discussed later, the data on the encrypted common key transmitted from the client 100 may be inputted to the input unit 222A via the interface. When receiving the data, the input unit 222A transmits the data to the main control unit 222B. The input unit 222A may further receive data transmitted from the application 221 via the interface. As will be discussed later, the data is intended to be transmitted to the client 100 after being encrypted. When receiving the data, the input unit 222A transmits the data to the server second encryption/decryption unit 222F.

The main control unit 222B controls the overall encryption/decryption unit 222. As described above, data on solutions transmitted from the client 100 may be received by the main control unit 222B from the input unit 222A. When receiving the data, the main control unit 222B transmits the data to the authentication unit 222H and sends the server solution generating unit 222C an instruction to generate a solution. The main control unit 222B may also receive authentication data, which will be discussed later, from the authentication unit 222H. When receiving the data, the main control unit 222B sends the server solution generating unit 222C an instruction to generate a solution.

The main control unit 222B has the server certificate and the SSL certificate. Typically, the administrator of the server 200 acquires the certificates from a certification authority that issues the server certificate or the SSL certificate, and installs the certificates on the server 200. The server certificate and the SSL certificate in the present embodiment are ordinary certificates used in current SSL communications. The SSL certificate is identical to that in the description of the client 100. The server certificate describes information on the server 200, includes the embedded public key of the server, and is attached with the digital signature of the certification authority having issued the server certificate, the digital signature being attached to prove the authenticity of the server certificate. The single server certificate is provided but multiple SSL certificates may be provided. The circumstances are similar to those of conventional SSL communications. The main control unit 222B transmits the server certificate and the SSL certificate to the server first encryption/decryption unit 222E at a timing that will be discussed later.

The server solution generating unit 222C can successively generate solutions like the client solution generating unit 122C. The solutions successively generated by the server solution generating unit 222C agree with solutions successively generated by the client solution generating unit 122C under common conditions. In the present embodiment, the solutions are successively generated by the server solution generating unit 222C and the client solution generating unit 122C according to a common method.

Data for generating a new solution, that is, the same initial value or past solution data as in the solution data recording unit 122D of the client 100 is recorded in the solution data recording unit 222D. It is necessary for the server 200 to authenticate the multiple clients 100. Thus, in the server 200, data for identifying the client 100 (in the present embodiment, the IP address of the client 100 is used as data for identifying the client 100 but other data may be used, for example, a unique identifier that has been allocated to the client 100 from the timing of sale of the client 100 and is strictly managed by a vendor of the client 100 or an organization for authentication) and data for generating a new solution for each of the clients 100 are recorded so as to be associated with each other. Specifically, in the present embodiment, the solutions are successively generated in different rows for the clients 100 by the client solution generating unit 122C. The server 200 can generate solutions in the same rows as the rows of solutions generated by the clients 100. In other words, the server solution generating unit 222C of the server 200 and the client solution generating unit 122C in each of the clients 100 are configured to synchronize the solutions.

When generating a solution, the server solution generating unit 222C transmits the solution to the server first encryption/decryption unit 222E or the authentication unit 222H. When the server solution generating unit 222C transmits the solution to the authentication unit 222H, data recorded for specifying the client 100 in the solution data recording unit 222D is also transmitted to the authentication unit 222H. The data is referred to in the generation of the solution.

The server first encryption/decryption unit 222E is configured to perform encryption and decryption. As will be discussed later, the present embodiment is sufficiently implemented as long as at least encryption is performed. Data encrypted by the server first encryption/decryption unit 222E can be decrypted at least by the client first encryption/decryption unit 122E of the client 100. As in the encryption and decryption by the client first encryption/decryption unit 122E, solutions are used for encryption and decryption by the server first encryption/decryption unit 222E. As described above, the solution generated by the server solution generating unit 222C is transmitted from the server solution generating unit 222C to the server first encryption/decryption unit 222E. The solution is used for the encryption performed by the server first encryption/decryption unit 222E. The server first encryption/decryption unit 222E receives data on the server certificate and SSL certificate from the main control unit 222B. As will be discussed later, the data on the server certificate and SSL certificate is transmitted to the client 100. The data is encrypted by the server first encryption/decryption unit 222E. As will be discussed later, the data on the encrypted server certificate and SSL certificate is decrypted back into the data on the server certificate and SSL certificate by the client first encryption/decryption unit 122E.

The server first encryption/decryption unit 222E transmits the data on the encrypted server certificate and SSL certificate to the output unit 222G.

The private-key decryption unit 222I is configured to perform decryption using the private key. The private-key decryption unit 222I includes the private key paired with the public key embedded in the server certificate.

From the main control unit 222B, the private-key decryption unit 222I may receive data on the common key that is encrypted with the public key and is transmitted from the client 100. The private-key decryption unit 222I decrypts the data on the encrypted common key by using the private key, so that the data can be decrypted back into original data on the common key.

Also in conventional SSL communications, a client encrypts the common key of the client with a public key and transmits the common key to a server. The server then decrypts the encrypted common key with a private key. Thus, the private-key decryption unit 222I can be implemented using functions in conventional SSL communications.

The private-key decryption unit 222I transmits the data on the common key acquired by the above-described decryption to the server second encryption/decryption unit 222F.

The server second encryption/decryption unit 222F is configured to perform encryption and decryption. The encryption and decryption are performed using the common key transmitted from the private-key decryption unit 222I. The target of encryption is plaintext data transmitted from the application 221 via the input unit 222A. The target of decryption is encrypted data that is transmitted from the client 100 via the network 400, the transmit/receive mechanism, the interface, and the input unit 222A.

The encryption and decryption by the server second encryption/decryption unit 222F may be performed in any way as long as a common key is used in the encryption and decryption. If the same common key is used, data encrypted by the server second encryption/decryption unit 222F can be decrypted by the client second encryption/decryption unit 122F while data encrypted by the client second encryption/decryption unit 122F can be decrypted by the server second encryption/decryption unit 222F.

The server second encryption/decryption unit 222F encrypts data from the application 221 and then transmits the data to the output unit 222G. The server second encryption/decryption unit 222F decrypts encrypted data transmitted from the client 100 and then transmits the data to the output unit 222G.

The authentication unit 222H is configured to determine whether the client 100 is authorized or not, that is, to authenticate the client 100. As described above, data on solutions transmitted from the client 100 is transmitted to the authentication unit 222H from the main control unit 222B. Moreover, the authentication unit 222H receives data on solutions from the solution data recording unit 222D and data that is referred to in the generation of the solutions and specifies the client 100. The authentication unit 222H determines whether the client 100 is authorized or not, by using the three kinds of data. When the client 100 is authenticated, authentication data is generated. A specific authentication method will be described later.

When the authentication is performed, the authentication unit 222H generates authentication data and transmits the authentication data to the main control unit 222B.

The output unit 222G is configured to output data generated in the encryption/decryption unit 222 to the outside.

The output unit 222G may receive encrypted data from the server second encryption/decryption unit 222F, the data being encrypted by the server second encryption/decryption unit 222F after being transmitted from the application 221. Moreover, the output unit 222G may receive decrypted data from the server second encryption/decryption unit 222F, the data being decrypted by the server second encryption/decryption unit 222F after being transmitted as encrypted data from the client 100.

The output unit 222G transmits the data encrypted by the server second encryption/decryption unit 222F after being transmitted from the application 221, to the interface via the transmit/receive unit 223. The data transmitted to the interface is transmitted to the client 100 via the transmit/receive mechanism and the network 400. Moreover, the output unit 222G may receive the data on the encrypted server certificate and SSL certificate from the server first encryption/decryption unit 222E. The data is also transmitted to the client 100 as described above.

The output unit 222G also transfers, to the application 221, the data decrypted by the server second encryption/decryption unit 222F after being transferred as encrypted data from the client 100. The data is used in the application 221.

The method of use and operations of the SSL communication system including the client 100 and the server 200 will be described below.

Figure 8:
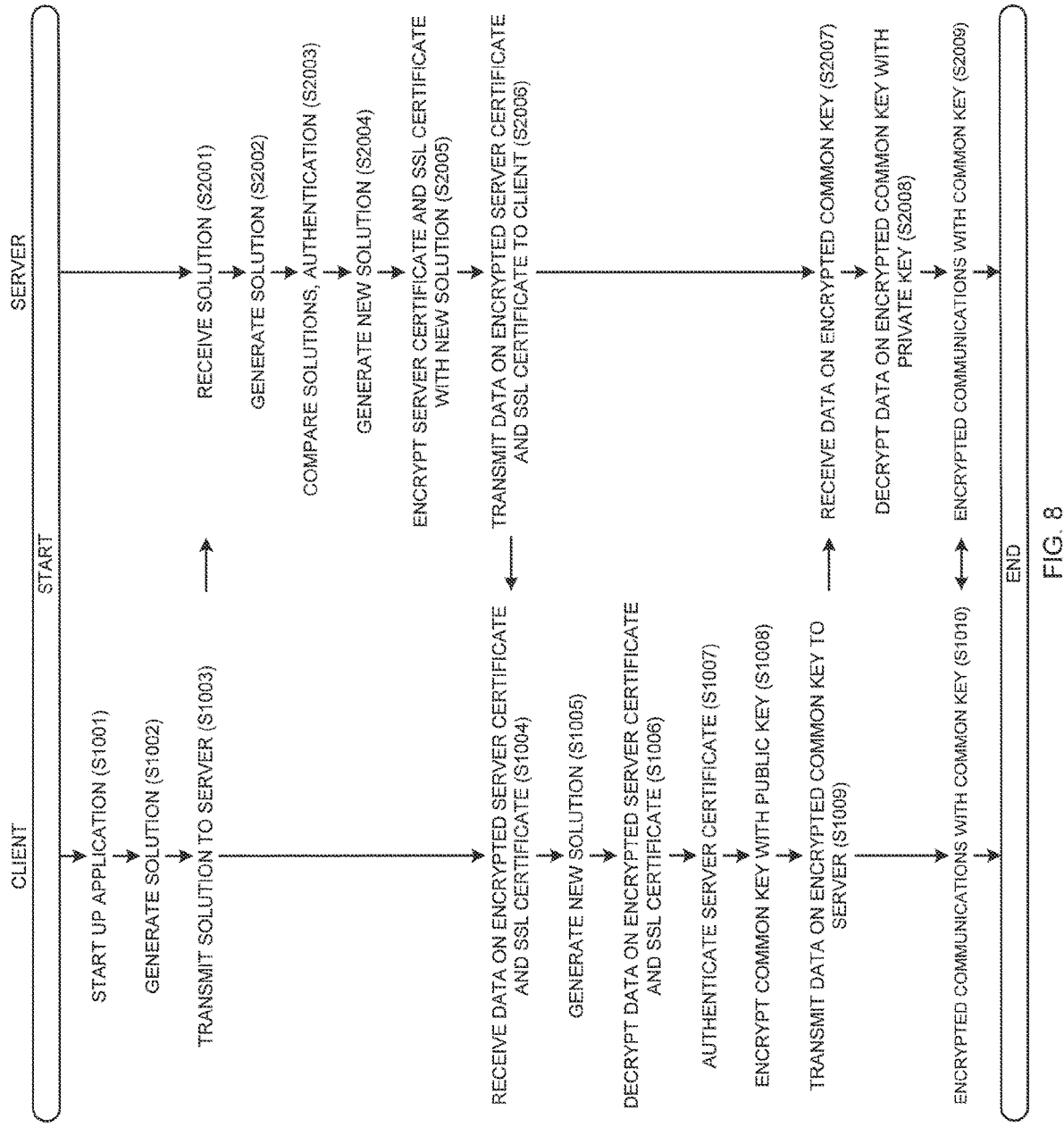
FIG. 8 shows a processing flow of communications in the SSL communication system shown in FIG. 1.

The description mainly refers to FIG. 8.

First, a user operates the client 100 and attempts to carry out communications between the client 100 and the server 200. For example, the user connects the client 100 to the server 200 and attempts to view web sites provided by the server 200.

For this operation, the user first starts up the application 121 on the client 100 (S1001). The application 121 started for viewing web sites is typically a known browser. The user optionally operates the input device 102 so as to start up the browser. The operation contents for starting up the browser are transmitted from the input device 102 to the application 121 via the interface 114. Thus, the application 121 is started and image data is transmitted to the display 101 via the interface 114, so that the browser is displayed on the display 101 of the client 100.

In this state, the user attempts to view web sites provided by the server 200. Typically, the client 100 specifies the web address (URL) of the server 200 so as to start communications with the server 200. At this point, the client 100 first starts processing for the authentication of the client 100. Specifically, when the user specifies the web address of the server 200 on the browser, data on the operation contents is transmitted from the input device 102 to the input unit 122A via the interface 114. The data on the operation contents is transmitted from the input unit 122A to the main control unit 122B. When receiving data, the main control unit 122B sends the client solution generating unit 122C an instruction to generate a solution. The client solution generating unit 122C generates the solution (S1002).

The client solution generating unit 122C generates the solution according to the foregoing method. If the client solution generating unit 122C generates a solution for the first time, the client solution generating unit 122C reads an initial value from the solution data recording unit 122D, otherwise the client solution generating unit 122C reads a past solution from the solution data recording unit 122D. Based on the initial value or the past solution, the client solution generating unit 122C generates a new solution. The generated solution is transmitted from the client solution generating unit 122C to the output unit 122G.

The output unit 122G transmits the received solution to the transmit/receive unit 123. The transmit/receive unit 123 performs predetermined processing, for example, the attachment of a header to data on the solution according to the TCP/IP protocols. At this point, the header includes the IP address of the client 100 and the web address of the server 200. The IP address of the client 100 is information for discriminating the client 100 from other clients 100. In SSL communications, common rules are established in which a predetermined number (typically 443) is described as the port number of a destination subsequently to a web address, indicating that data including the header requires SSL communications. Encrypted communications may also conform to the rules. In any case, the data on the solution with the header is transmitted from the transmit/receive unit 123 to the transmit/receive mechanism via the interface 114.

The data on the solution is transmitted from the transmit/receive mechanism to the server 200 via the network 400 (S1003). The data on the solution can be transmitted to the server 200 after being encrypted in the client 100. In the present embodiment, the solution is transmitted to the server 200 without being encrypted.

The solution is received by the server 200 (S2001). Specifically, the data on the solution is received by the transmit/receive mechanism of the server 200 and is transmitted from the interface to the transmit/receive unit 223. The transmit/receive unit 223 transmits, to the input unit 222A, the data on the solution and the IP address of the client 100 that is a sender of the solution. The IP address is included in the header. The data and the IP address are transmitted from the input unit 222A to the main control unit 222B.

The main control unit 222B transmits the data on the solution and the IP address, which are associated with each other, to the authentication unit 222H.

Moreover, the main control unit 222B transmits the data on the IP address to the server solution generating unit 222C and sends the server solution generating unit 222C an instruction to generate a solution. When receiving the data and the instruction, the server solution generating unit 222C generates the solution (S2002). The server solution generating unit 222C reads data associated with the IP address received from the main control unit 222B, from among data (data on the initial value or past solutions) for generating a new solution for each of the clients 100 recorded in the solution data recording unit 222D. Subsequently, a new solution is generated using the data on the initial value or past solutions according to the foregoing method. The server solution generating unit 222C transmits, to the authentication unit 222H, the generated solution and the IP address for specifying the client 100 that is a sender of the solution. The solution and the IP address are associated with each other.

As described above, the authentication unit 222H has the solution and the IP address that have been transmitted from the main control unit 222B. The authentication unit 222H has the solution and the IP address that have been transmitted from the server solution generating unit 222C. In this case, IP addresses are necessary. This is because if multiple solutions are transmitted from the multiple clients 100 in a short time, which ones of the solutions should be compared with each other may be unclear at the time of a comparison between the solution transmitted from the main control unit 222B and the solution transmitted from the server solution generating unit 222C. The comparison is performed in the authentication unit 222H as will be discussed later. The present invention is not limited to this comparison. In the present embodiment, the solution transmitted from the main control unit 222B associated with the same IP address and the solution transmitted from the server solution generating unit 222C are compared with each other so as to verify whether the client 100 having transmitted the solution is authorized or not.

As described above, the solution generated by the server solution generating unit 222C is synchronized with the solution generated by the client solution generating unit 122C of the client 100. Thus, if the client 100 is authorized, the two solutions to be compared with each other always agree with each other. If the solutions agree with each other, the authentication unit 222H authenticates the client 100 that is a sender of the solution, and generates authentication data on the authentication (S2003).

The authentication data associated with the IP address of the authenticated client 100 is transmitted to the main control unit 222B. If the two solutions do not agree with each other, the authentication unit 222H can notify the main control unit 222B that the client 100 is not authorized, and then cut off communications between the client 100 and the server 200 in the present embodiment. As a matter of course, the server 200 at this point may notify the client 100 that the client 100 has not been authenticated.

When receiving the authentication data and the IP address, the main control unit 222B transmits the server certificate and the SSL certificate of the main control unit 222B in association with the IP address to the server first encryption/decryption unit 222E.

In the meantime, the main control unit 222B transmits the server certificate and SSL certificate associated with the IP address to the server first encryption/decryption unit 222E and sends the server solution generating unit 222C an instruction to generate a new solution. The server solution generating unit 222C generates at least one solution (S2004). The generated solution is transmitted with the IP address serving as a trigger of the instruction to generate the solution, to the server first encryption/decryption unit 222E. In this case, the solution is generated by the server solution generating unit 222C under predetermined conditions, for example, the number of solutions to be generated or which one of the solutions (e.g., the second generated solution or the one hundredth generated solution) is to be transmitted to the server first encryption/decryption unit 222E. This information is shared with the client 100.

As described above, the server first encryption/decryption unit 222E encrypts the received data on the server certificate and SSL certificate (S2005). The solution transmitted from the server solution generating unit 222C is used for the encryption. The solution used for encrypting the server certificate and SSL certificate may be selected with the same IP address associated with the server certificate and SSL certificate. The encryption is performed by the server first encryption/decryption unit 222E such that data obtained as a result of encryption depends on the solution. The solution may be used in any way as long as data obtained as a result of encryption depends on the solution. For example, the solution may be an encryption key. At this point, data on the IP address associated with the data on the server certificate and SSL certificate is not encrypted.

The data on the encrypted server certificate and SSL certificate is transmitted, to the output unit 222G, with data on an IP address that is associated with the data on the server certificate and SSL certificate before encryption.

The output unit 222G transmits the data to the transmit/receive unit 223. The transmit/receive unit 223 attaches a header indicating a destination to the data on the encrypted server certificate and SSL certificate. The destination can be specified by the IP address. The data on the encrypted server certificate and SSL certificate with the header is transmitted from the transmit/receive unit 223 to the interface and then is transmitted from the transmit/receive mechanism to the client 100 via the network 400 (S2006).

The client 100 receives the data on the encrypted server certificate and SSL certificate (S1004). The data on the encrypted server certificate and SSL certificate is received by the transmit/receive mechanism of the client 100 and is transmitted to the transmit/receive unit 123 via the interface 114. The transmit/receive unit 123 transmits the data to the input unit 122A.

The input unit 122A transmits the data on the encrypted server certificate and SSL certificate to the client first encryption/decryption unit 122E. In the meantime, the input unit 122A sends a notification on the reception of the data on the encrypted server certificate and SSL certificate to the main control unit 122B. When receiving the data, the main control unit 122B sends the client solution generating unit 122C an instruction to generate a new solution.

When receiving the instruction, the client solution generating unit 122C generates at least one new solution (S1005). The generated solution is transmitted from the client solution generating unit 122C to the client first encryption/decryption unit 122E.

In this case, the solution is generated by the client solution generating unit 122C under predetermined conditions, for example, the number of solutions to be generated or which one of the solutions (e.g., the second generated solution or the one hundredth generated solution) is to be transmitted to the client first encryption/decryption unit 122E. This information is shared with the server 200. The client solution generating unit 122C can successively generate common keys with the server solution generating unit 222C under common conditions. Thus, the solution used for encrypting the data on the common key by the server first encryption/decryption unit 222E, completely the same solution as the solution generated by the server solution generating unit 222C and transmitted to the server first encryption/decryption unit 222E is transmitted from the client solution generating unit 122C to the client first encryption/decryption unit 122E.

The client first encryption/decryption unit 122E decrypts the data on the encrypted server certificate and SSL certificate by using the solution, so that the data is decrypted back into plaintext data on the server certificate and SSL certificate (S1006). The decryption by the client first encryption/decryption unit 122E depends on the solution. If the same solution is used, the data encrypted by the server solution generating unit 222C can be decrypted into original plaintext data. Thus, the data on the encrypted common key is decrypted back into the data on the server certificate and SSL certificate as generated by the main control unit 222B of the server 200.

The client first encryption/decryption unit 122E transmits the server certificate and the SSL certificate to the authentication unit 122H. The authentication unit 122H having received the server certificate and the SSL certificate sends the main control unit 122B an instruction to transmit the SSL certificate, and receives the original SSL certificate of the main control unit 122B from the main control unit 122B.

In this state, the authentication unit 122H verifies whether the server 200 is authorized or not or whether the server certificate is authorized or not (S1007).

This processing can be performed as the same processing as the authentication of the server certificate in conventional SSL communications.

For example, the SSL certificate of the client 100 and the SSL certificate transmitted from the server 200 completely agree with each other. In this state, the server 200 determines that the SSL certificate of the server 200 or the public key attached to the SSL certificate is authorized. At this point, the authentication unit 122H of the client 100 compares a hash value obtained by, for example, hashing the overall server certificate and a value obtained by decrypting, with the public key attached to the SSL certificate, the digital signature attached to the server certificate. The digital signature attached to the server certificate is the hash value obtained by, for example, hashing the overall server certificate. The hash value is encrypted by a certification authority having issued the server certificate, with the private key of the certification authority. Thus, the two values always agree with each other unless the server certificate including the digital signature is subjected to any changes including tampering by a malicious third party after the server certificate is issued by the certification authority. This can authenticate the server certificate.

In actual SSL communications, certification authorities including a route certification authority vary in degree of reliability. The route certification authority at the highest degree of reliability can authenticate the SSL certificate by attaching the digital signature of the certification authority to the SSL certificate (route certificate) of the certification authority. SSL certificates also vary in degree of reliability. In the authentication of SSL communications, SSL certificates may be used in multiple stages and the server certificate is authenticated using the SSL certificate reliable to the authentication unit 122H of the client 100. The authentication unit 122H of the present application can also perform the processing.

In any case, if the authentication unit 122H authenticates the server certificate, the authentication unit 122H extracts the embedded public key from the server certificate and transmits the public key to the main control unit 122B. The main control unit 122B transmits the public key with the common key of the main control unit 122B to the public-key encryption unit 122I.

The main control unit 122B further transmits data on the common key to the client second encryption/decryption unit 122F. Naturally, the common key is not encrypted. Thus, the client second encryption/decryption unit 122F has the common key required for encrypted communications in the common key system.

The public-key encryption unit 122I having received the common key and the public key encrypts the common key with the public key as in conventional SSL communications (S1008).

The encrypted common key is transmitted from the public-key encryption unit 122I to the output unit 122G.

Data on the encrypted common key is optionally attached with a header in the output unit 122G, is transmitted from the interface 114 to the transmit/receive mechanism, and is transmitted to the server 200 via the network 400 (S1009).

The server 200 receives the data on the encrypted common key by the transmit/receive mechanism (S2007). The data on the encrypted common key is transmitted to the input unit 222A through the interface and the transmit/receive unit 223 and then is transmitted to the private-key decryption unit 222I from the input unit 222A through the main control unit 222B.

As described above, the private-key decryption unit 222I has the private key and can decrypt encrypted data with the public key paired with the private key. Moreover, the public key used for encrypting the encrypted common key, that is, the public key embedded in the server certificate transmitted from the server 200 to the client 100 is paired with the private key of the private-key decryption unit 222I in the server 200, so that the private-key decryption unit 222I can decrypt the encrypted common key that is received from the main control unit 222B.

The private-key decryption unit 222I decrypts the encrypted common key by using the private key (S2008).

The decrypted common key is transmitted from the private-key decryption unit 222I to the server second encryption/decryption unit 222F.

The processing allows the server second encryption/decryption unit 222F in the server 200 and the client second encryption/decryption unit 122F in the client 100 to have the common key.

If the server second encryption/decryption unit 222F in the server 200 and the client second encryption/decryption unit 122F in the client 100 have the common key, the server 200 and the client 100 can perform encrypted communications as in the process of (3) describing conventional SSL communications.

Such encrypted communications are implemented by transmitting encrypted data from the client 100 to the server 200 or from the server 200 to the client 100 (S1010, S2009).

For example, data to be encrypted and transmitted to the server 200 is generated by the application 121 of the client 100, and then the data is transmitted from the application 121 to the encryption/decryption unit 122. When the input unit 122A of the encryption/decryption unit 122 receives the data, the data is transmitted to the client second encryption/decryption unit 122F and is encrypted therein with the common key. The encrypted data is transmitted from the output unit 122G to the transmit/receive unit 123, after the processing of attaching a header to the encrypted data is performed optionally, the encrypted data is transmitted with the header from the interface 114 to the transmit/receive mechanism, and then is transmitted to the server 200 via the network 400.

The server 200 receives the data by the transmit/receive mechanism. The data is transmitted from the transmit/receive mechanism of the server 200 to the interface and then is transmitted to the input unit 222A via the transmit/receive unit 223. The encrypted data is decrypted with the common key by the server second encryption/decryption unit 222F and then is transmitted to the output unit 222G. The output unit 222G transmits the decrypted data to the application 221 and the application 221 optionally uses the data.

In the meantime, the application 221 of the server 200 may generate plaintext data to be encrypted and transmitted to the client 100. If the application 221 generates such data, the data is transmitted to the input unit 222A in the encryption/decryption unit 222. The data is transmitted from the input unit 222A to the server second encryption/decryption unit 222F and then is decrypted therein with the common key. The data encrypted by the server second encryption/decryption unit 222F is transmitted to the transmit/receive unit 223 via the output unit 222G. The transmit/receive unit 223 optionally performs the processing of attaching a header to the encrypted data. The processed data is transmitted from the transmit/receive unit 223 to the transmit/receive mechanism of the server 200 via the interface and is transmitted to the client 100 via the network 400.

The client 100 receives the data by the transmit/receive mechanism. The data is transmitted from the transmit/receive mechanism of the client 100 to the interface 114 and then is transmitted to the input unit 122A via the transmit/receive unit 123. The encrypted data is decrypted with the common key by the client second encryption/decryption unit 122F and is transmitted to the output unit 122G. The output unit 122G transmits the decrypted data to the application 121 and the application 121 optionally uses the data.

In this way, encrypted communications with the common key in the common key system are performed between the server 200 and the client 100.

In the encrypted communications, encryption and decryption are performed by the encryption/decryption unit 222 in the server 200, the encryption/decryption unit 222 being provided between the application 221 and the transmit/receive unit 223 for performing TCP/IP communications. In the client 100, encryption and decryption are performed by the encryption/decryption unit 122 provided between the application 121 and the transmit/receive unit 123 for performing TCP/IP communications. Encryption and decryption between an application and TCP/IP are shared with the conventional SSL communication protocol. Thus, the invention of the embodiment is relatively easily applied to existing SSL communications. In the present invention, encryption and decryption are not always performed between the application and TCP/IP.

If communications are not necessary, communications between the server 200 and the client 100 are terminated.

Second Embodiment

A communication system according to a second embodiment will be described below.

The SSL communication system in the second embodiment is substantially identical to that of the first embodiment. In communications between the client 100 and the server 200 in the SSL communication system of the first embodiment, the server certificate and the SSL certificate are encrypted when being transmitted from the server 200 to the client 100, whereas in the second embodiment, a server certificate and an SSL certificate are transmitted from a server 200 to a client 100 without being encrypted.

Based on the difference, the server 200 and the client 100 are slightly changed. The hardware configurations of the server 200 and the client 100 are identical to those of the first embodiment but the second embodiment is slightly different from the first embodiment in functional blocks generated in the server 200 and the client 100.

Figure 9:
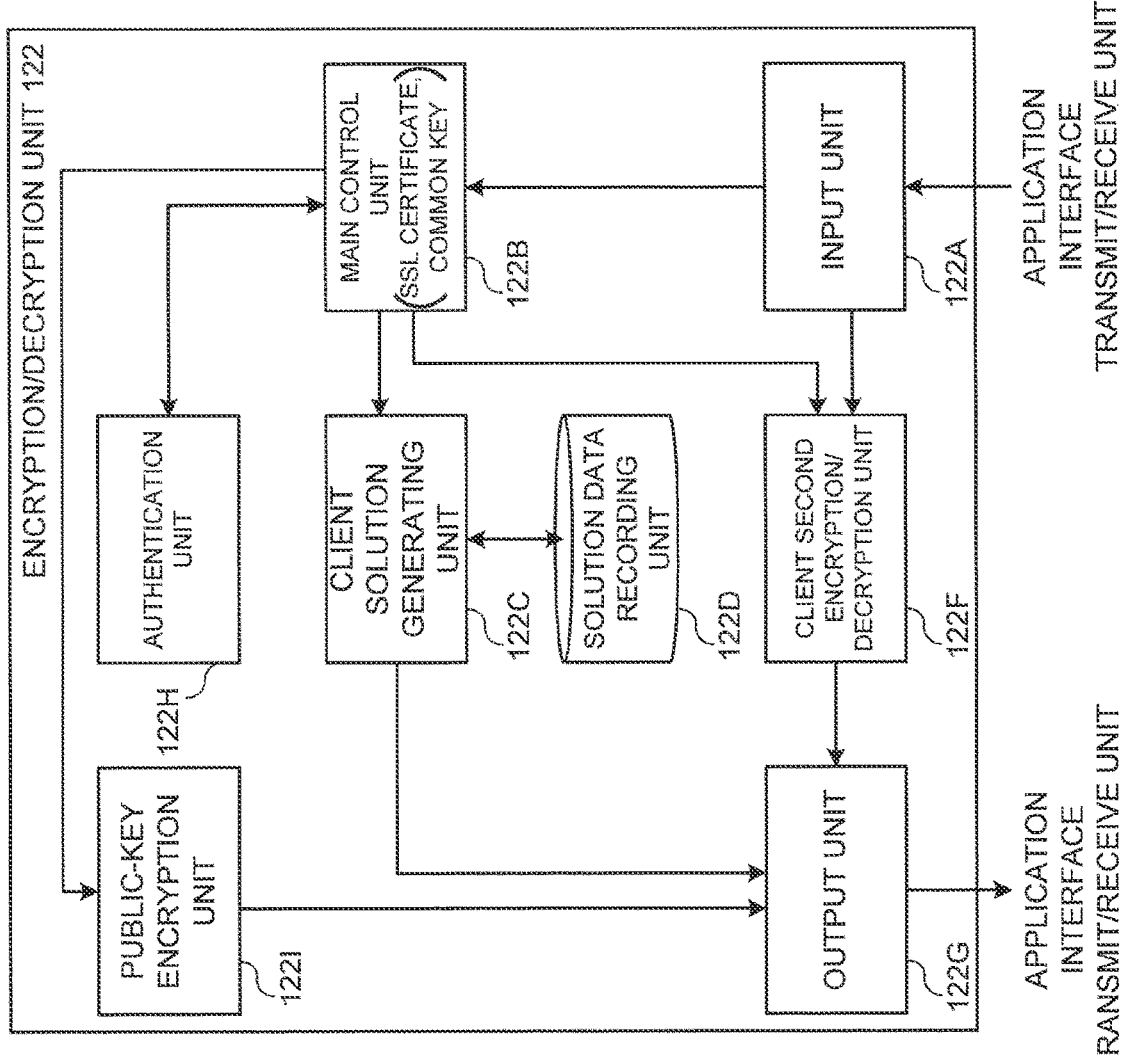
FIG. 9 shows functional blocks generated in the encryption/decryption unit of a client according to a second embodiment.
Figure 10:
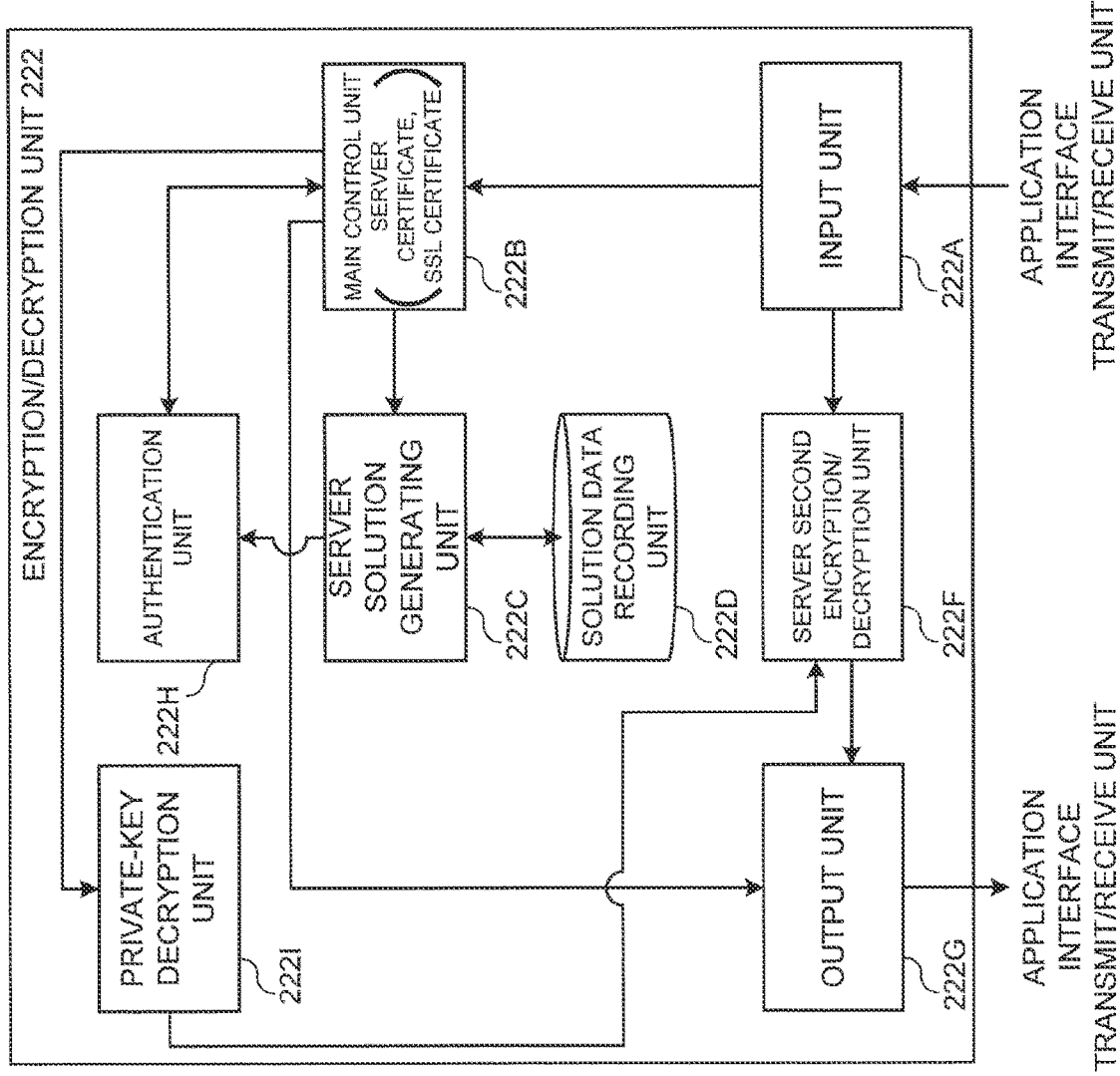
FIG. 10 shows functional blocks generated in the encryption/decryption unit of a server according to the second embodiment.

The difference is that an encryption/decryption unit 122 of the client 100 in the second embodiment does not include the client first encryption/decryption unit 122E provided in the first embodiment and an encryption/decryption unit 222 of the server 200 in the second embodiment does not include the server first encryption/decryption unit 222E provided in the first embodiment (FIGS. 9 and 10).

The method of use and operations of the SSL communication system according to the second embodiment will be described below.

Figure 11:
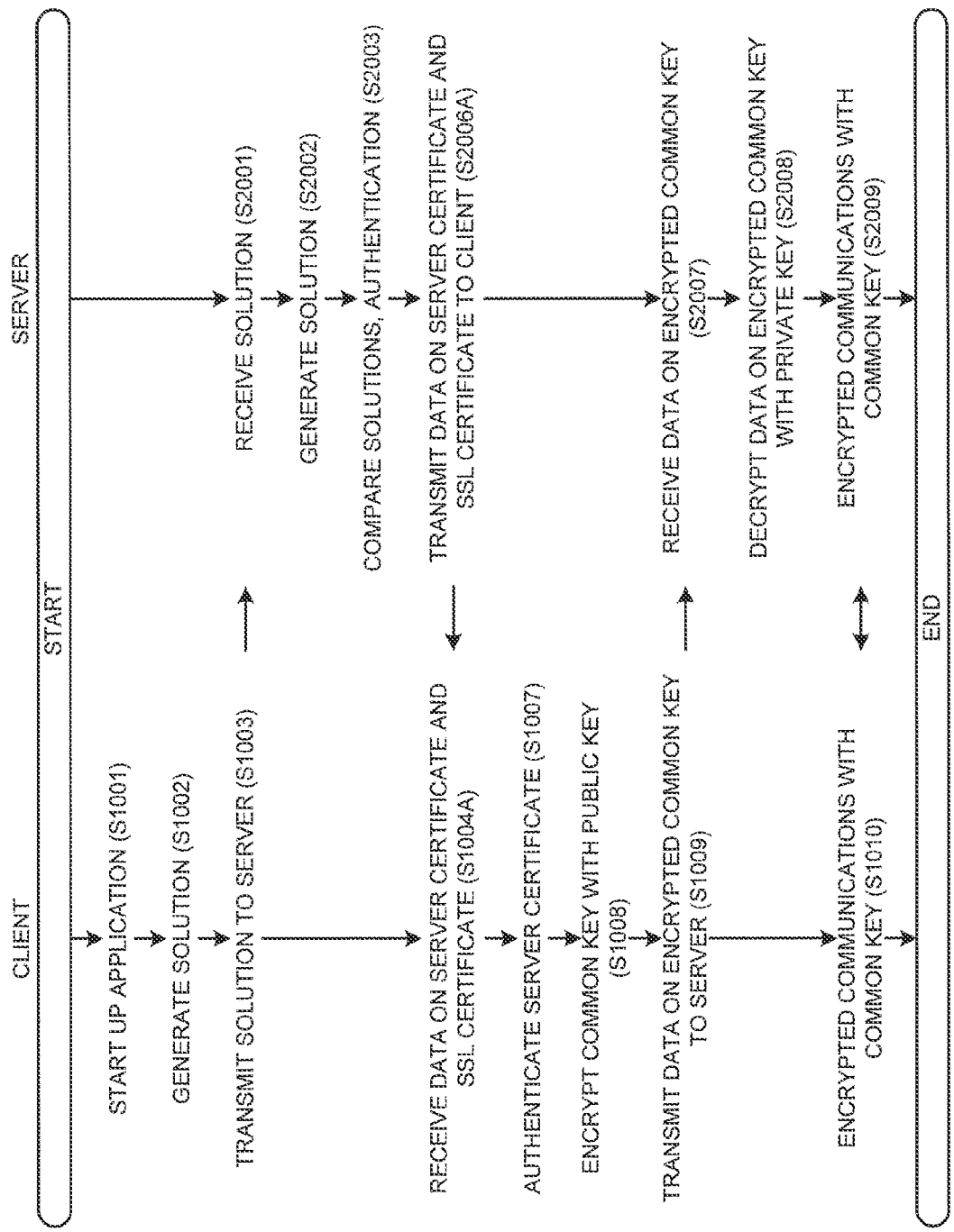
FIG. 11 shows a processing flow of communications in an SSL communication system according to the second embodiment.

The method performed in the SSL communication system is substantially the same as that of the first embodiment and thus the difference will be mainly discussed below (FIG. 11). The difference of the second embodiment is the absence of the processing of S1005 and S1006 in the client 100 of the first embodiment and the absence of the processing of S2004 and S2005 in the server 200 of the first embodiment.

The difference will be discussed in detail.

The processing of S1001 to S1003 performed by the client 100 in the first embodiment and the processing of S2001 to S2003 performed by the server 200 in the first embodiment are identical to the processing in the second embodiment.

Also in the second embodiment, an authentication unit 222H of the server 200 authenticates the client 100 (S2003). The authentication generates authentication data in the second embodiment as in the first embodiment.

In the first embodiment, the authentication data generated by the authentication unit 222H is transmitted to the main control unit 222B, a new solution is generated (S2004), and then the common key is encrypted using the new solution (S2005). However, in the second embodiment, a main control unit 222B having received authentication data transmits a server certificate and an SSL certificate in plain text to an output unit 222G while the certificates are associated with data on the IP address of the client 100, the IP address being attached to the authentication data.

The data on the server certificate and the SSL certificate that are associated with the data on the IP address is transmitted from the output unit 222G to a transmit/receive unit 223. The data on the server certificate and the SSL certificate with a header optionally attached as in the first embodiment is transmitted to a transmit/receive mechanism via an interface and then is transmitted from the transmit/receive mechanism to the client 100 via a network 400 (S2006A).

The client 100 receives the data on the server certificate and the SSL certificate (S1004A). The data on the server certificate and the SSL certificate is not encrypted.

The data on the server certificate and the SSL certificate is transmitted from the transmit/receive mechanism to the main control unit 122B via the interface 114. The main control unit 122B transmits the server certificate and the SSL certificate that are received from an input unit 122A, with the SSL certificate of the main control unit 122B to an authentication unit 122H.

In this state, the authentication unit 122H verifies whether the server 200 or the server certificate is authorized or not (S1007).

The subsequent processing is identical to that of the first embodiment.

Third Embodiment

An SSL communication system according to a third embodiment will be described below. The configuration and operations of the SSL communication system according to the third embodiment are substantially identical to those of the SSL communication system according to the first embodiment. The SSL communication system of the third embodiment is different from the SSL communication system in the first embodiment as follows: the encrypted server certificate and SSL certificate are transmitted from the server 200 to the client 100 in the first embodiment, whereas in the third embodiment, a server certificate and an SSL certificate in plain text are also transmitted as in the second embodiment.

The hardware configurations of a client 100 and a server 200 according to the third embodiment are identical to those of the first embodiment. Furthermore, functional blocks generated in the client 100 and the server 200 in the third embodiment are also identical to those of the first embodiment.

Based on the above-mentioned difference, the functions of the functional block in the client 100 and the server 200 according to the third embodiment are slightly different from those of the first embodiment. Differences will be discussed later.

The method of use and operations of the SSL communication system according to the third embodiment will be described below.

Figure 12:
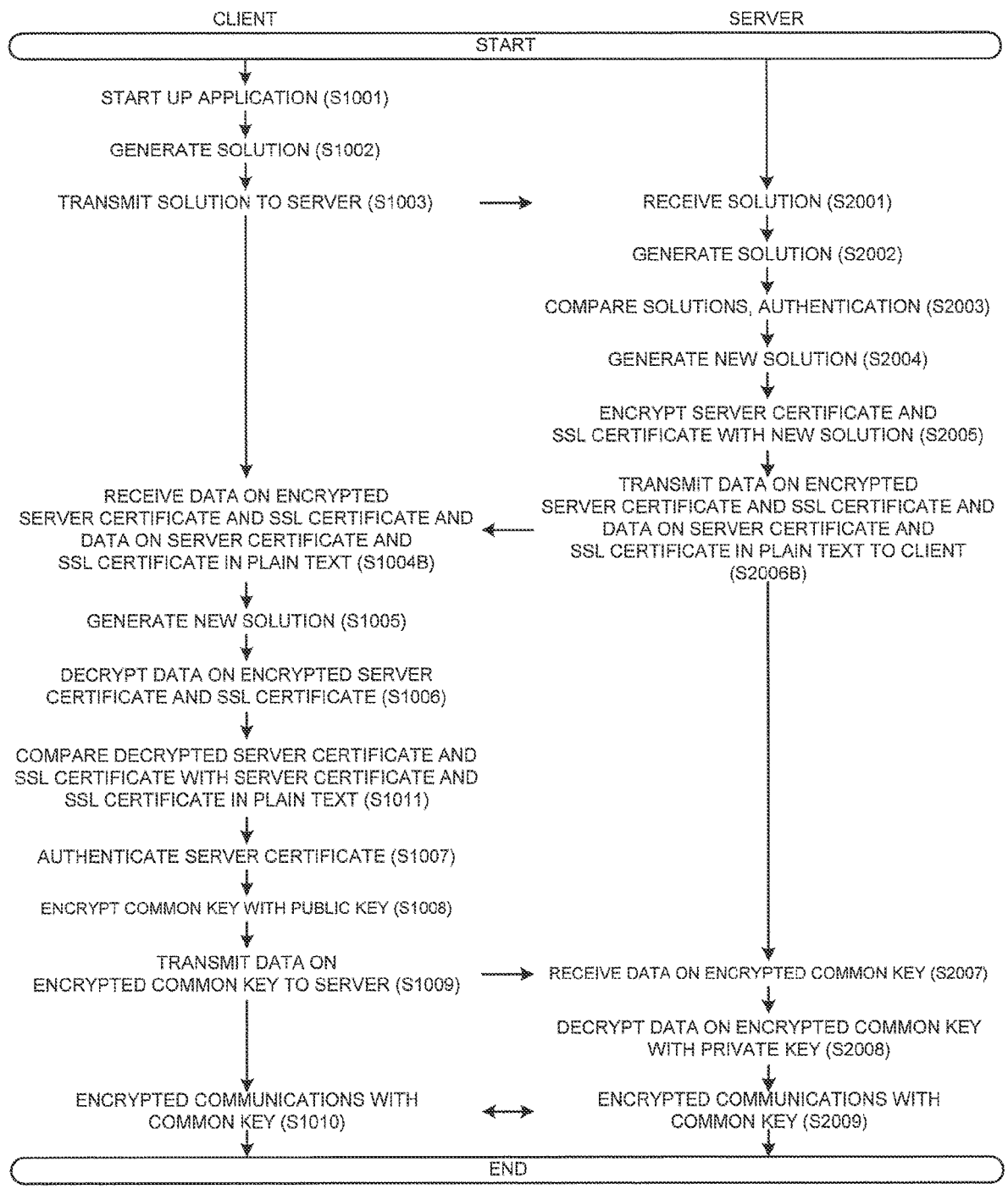
FIG. 12 shows a processing flow of communications in an SSL communication system according to a third embodiment.

The method performed in the SSL communication system is substantially the same as that of the first embodiment and thus the difference will be mainly discussed below (FIG. 12).

First, the processing of S1001 to S1003 performed by the client 100 in the first embodiment and the processing of S2001 to S2005 performed by the server 200 in the first embodiment are identical to the processing of the third embodiment.

Also in the third embodiment, data on the server certificate and the SSL certificate is encrypted by a server first encryption/decryption unit 222E (S2005). In the first embodiment, data on the encrypted server certificate and SSL certificate is then transmitted to the output unit 222G with data on the IP address associated with data on the server certificate and the SSL certificate in plain text. In the third embodiment, data on the encrypted server certificate and SSL certificate and data on the server certificate and the SSL certificate in plain text are transmitted to an output unit 222G with an IP address associated with the data on the server certificate and the SSL certificate in plain text.

In the first embodiment, only the encrypted server certificate and SSL certificate are transmitted from the server 200 to the client 100, whereas in the third embodiment, the data on the server certificate and the SSL certificate in plain text is also transmitted from the server 200 to the client 100.

Specifically, the data on the encrypted server certificate and SSL certificate, the data on the server certificate and the SSL certificate in plain text, and the data on the IP address associated with the data on the server certificate and the SSL certificate in plain text are transmitted to the output unit 222G and then are transmitted from the output unit 222G to a transmit/receive unit 223. The data on the encrypted server certificate and SSL certificate and the data on the server certificate and the SSL certificate in plain text are optionally attached with a header as in the first embodiment, are transmitted to a transmit/receive mechanism via an interface, and then are transmitted from the transmit/receive mechanism to the client 100 via a network 400 (S2006B).

The client 100 receives the data on the encrypted server certificate and SSL certificate and the data on the server certificate and the SSL certificate in plain text (S1004B).

The data on the encrypted server certificate and SSL certificate is transmitted to a client first encryption/decryption unit 122E and is decrypted as in the first embodiment by using a solution generated by a client solution generating unit 122C according to the processing of S1005 as in the first embodiment (S1006).

In the meantime, the data on the server certificate and the SSL certificate in plain text is transmitted from the transmit/receive mechanism to an input unit 122A through an interface 114 and a transmit/receive unit 123, and then is transmitted from the input unit 122A to an authentication unit 122H through a main control unit 122B.

In this state, the authentication unit 122H includes the server certificate and SSL certificate that are transmitted in encrypted form from the server 200 and then are decrypted by the client first encryption/decryption unit 122E and the server certificate and the SSL certificate that are transmitted from the server 200 to the client 100 without being encrypted. The server certificate and the SSL certificate are both provided in plaintext form. The authentication unit 122H compares the server certificate that is transmitted in encrypted form from the server 200 and then is decrypted by the client first encryption/decryption unit 122E and the server certificate that is transmitted from the server 200 to the client 100 without being encrypted. The authentication unit 122H further compares the SSL certificate that is transmitted in encrypted form from the server 200 and then is decrypted by the client first encryption/decryption unit 122E and the SSL certificate that is transmitted from the server 200 to the client 100 without being encrypted (S1011).

The authentication unit 122H determines that the server certificate and the SSL certificate have not been tampered at all when being transmitted from the server 200 to the client 100, only if the server certificate that is transmitted in encrypted form from the server 200 and then is decrypted by the client first encryption/decryption unit 122E agrees with the server certificate that is transmitted from the server 200 to the client 100 without being encrypted and the SSL certificate that is transmitted in encrypted form from the server 200 and then is decrypted by the client first encryption/decryption unit 122E agrees with the SSL certificate that is transmitted from the server 200 to the client 100 without being encrypted.

Only in the case of such a positive determination, the authentication unit 122H of the third embodiment advances to the step of S1007 for the authentication of the server certificate according to the first embodiment. Otherwise communications between the server 200 and the client 100 are naturally terminated.

The subsequent processing is identical to that of the first embodiment.

In the present embodiment, the data on the encrypted server certificate and SSL certificate and the data on the server certificate and the SSL certificate in plain text are simultaneously transmitted from the server 200 to the client 100 in the processing of S2006B. It is not always necessary to simultaneously transmit the data from the server 200 to the client 100. During the processing of S1011, as long as the authentication unit 122H includes the server certificate and SSL certificate that are transmitted in encrypted form from the server 200 and then are decrypted by the client first encryption/decryption unit 122E and the server certificate and the SSL certificate that are transmitted from the server 200 to the client 100 without being encrypted, one of the data on the encrypted server certificate and SSL certificate and the data on the server certificate and the SSL certificate in plain text may be transmitted from the server 200 to the client 100 earlier than the other.

As described above, in the present embodiment, the authentication unit 122H determines that the server certificate and the SSL certificate have not been tampered at all on the conditions that the server certificate that is transmitted in encrypted form from the server 200 and then is decrypted by the client first encryption/decryption unit 122E agrees with the server certificate that is transmitted from the server 200 to the client 100 without being encrypted and the SSL certificate that is transmitted in encrypted form from the server 200 and then is decrypted by the client first encryption/decryption unit 122E agrees with the SSL certificate that is transmitted from the server 200 to the client 100 without being encrypted. However, a minimum requirement for the authentication unit 122H is to confirm the absence of tampering on the server certificate and thus the authentication unit 122H may determine that the server certificate has not been tampered at all only on the condition that the server certificate that is transmitted in encrypted form from the server 200 and then is decrypted by the client first encryption/decryption unit 122E agrees with the server certificate that is transmitted from the server 200 to the client 100 without being encrypted. In this case, naturally only the server certificate in plain text can be transmitted from the server 200 to the client 100 instead of the server certificate and the SSL certificate.

The invention claimed is:

1. A Secure Socket Layer (SSL) communication method implemented by a client of an encrypted communication system comprising: a server connectable to a predetermined network, the server including a private key, a server certificate for proving authenticity of the server with a digital signature including a public key paired with the private key, an SSL certificate for proving authenticity of the digital signature attached to the server certificate, and solution generating means capable of successively generating solutions, and the client connectable to the predetermined network, the client including an SSL certificate for proving the authenticity of the digital signature attached to the server certificate and solution generating means capable of successively generating solutions identical to those of the solution generating means of the server under common conditions, wherein the communication method implemented by the client includes the steps of:

generating the solution by the solution generating means and transmitting the solution to the server via the network;

receiving the server certificate and the SSL certificate of the server from server via the network, when the server received the solution from the client via the network, generated the solution by the solution generating means of the server under the same conditions as the solution generated by the solution generating means of the client, compared the solution generated by the solution generating means of the server and the solution received from the client, and authenticated the client when the solutions agree with each other, transmitted the server certificate and the SSL certificate to the client when the server authenticated the client;

verifying the authenticity of the server certificate transmitted from the server, by using the SSL certificate transmitted from the server and the SSL certificate of the client;

encrypting, when the server certificate is authenticated, a common key of the client by using the public key included in the server certificate;

transmitting the encrypted common key to the server via the network; and performing encrypted communications with the server in the common key system by using the common key shared between the server and the client, and the common key available to the server is the common key which was transmitted from the client in encrypted manner and was obtained by decrypting the encrypted common key with the private key of the server.

2. A Secure Socket Layer (SSL) communication method implemented by a server of an encrypted communication system comprising: the server connectable to a predetermined network, the server including a private key, a server certificate for proving authenticity of the server with a digital signature including a public key paired with the private key, an SSL certificate for proving authenticity of the digital signature attached to the server certificate, and solution generating means capable of successively generating solutions, and
   a client connectable to the predetermined network, the client including an SSL certificate for proving the authenticity of the digital signature attached to the server certificate and solution generating means capable of successively generating solutions identical to those of the solution generating means of the server under common conditions,
   wherein the communication method implemented by the server includes the steps of:
   receiving the solution which was generated by the solution generating means of the client and was transmitted from the client via the network;
   generating the solution by the solution generating means of the server under the same conditions as the solution generated by the solution generating means of the client, comparing the solution generated by the solution generating means of the server and the solution received from the client, and authenticating the client when the solutions agree with each other;
   transmitting the server certificate and the SSL certificate of the server to the client via the network when the server authenticates the client;
   receiving a common key in the encrypted manner which is transmitted from the client via the network, when the client received the server certificate and the SSL certificate from the server via the network, encrypted the common key of the client by using the public key included in the server certificate when the server certificate transmitted from the server was authenticated by using the SSL certificate transmitted from the server and the SSL certificate of the client;
   decrypting the encrypted common key with the private key of the server; and
   performing encrypted communications in a common key system with the client by using the common key shared between the server and the client in the above-mentioned steps.

3. A client connectable to a predetermined network so as to constitute a Secure Socket Layer (SSL) encrypted communication system in combination with a server connectable to the network, the server including a private key, a server certificate for proving authenticity of the server with a digital signature including a public key paired with the private key, an SSL certificate for proving authenticity of the digital signature attached to the server certificate, server solution generating means capable of successively generating solutions, private-key decryption means capable of decrypting, with the private key, data encrypted by the public key, and server second encryption/decryption means capable of encryption and decryption in a common key system with a common key,
   the client comprising:
   a memory;
   a processor in communication with the memory and operable, with instructions stored in the memory, to provide:
   an SSL certificate for proving the authenticity of the digital signature attached to the server certificate;
   client solution generating means capable of successively generating solutions identical to solutions generated by the server solution generating means under common conditions;
   client authentication means capable of verifying the authenticity of the server certificate transmitted from the server, by using the SSL certificate transmitted from the server and the SSL certificate of the client;
   the public-key encryption means capable of encryption using the public key; and
   client second encryption/decryption means capable of encryption and decryption in the common key system using the common key,
   wherein the client is arranged to generate the solution by the client solution generating means and to transmit the solution to the server via the network,
   the server receives the solution from the client via the network, generates the solution by the server solution generating means under the same conditions as the solution generated by the client solution generating means, compares the solution generated by the server solution generating means and the solution received from the client, and authenticates the client when the solutions agree with each other, and the client receives the server certificate and the SSL certificate of the server in transmission of the server certificate and the SSL certificate to the client via the network when the server authenticates the client,
   the public-key encryption means is arranged to encrypt the common key of the client and the client is arranged to transmit the encrypted common key to the server via the network when the server certificate transmitted from the server is authenticated by the client authentication means by using the SSL certificate transmitted from the server and the SSL certificate of the client,
   the server decrypts the encrypted and received common key with the private key by the private-key decryption means, and
   by using the common key shared between the server and the client in the above-mentioned steps, the server second encryption/decryption means encrypts and decrypts data to be transmitted and received and the client second encryption/decryption means encrypts and decrypts data to be transmitted and received, enabling encrypted communications with the server in the common key system.

4. The client according to claim 3, wherein the server includes server first encryption/decryption means capable of encryption using the solution generated by the server solution generating means, generates the second or subsequent solution by the server solution generating means under predetermined conditions before transmitting the server certificate and the SSL certificate of the server to the client via the network, encrypts the server certificate and the SSL certificate by the server first encryption/decryption means by using the solution generated by the server solution generating means, and transmits the encrypted server certificate and SSL certificate to the client,
   the client includes client first encryption/decryption means capable of decrypting data encrypted by the server first encryption/decryption means, by using the client solution generating means when the same solution is used,
   the client solution generating means is arranged to generate, when the client receives the encrypted server certificate and SSL certificate, the second or subsequent solution under the same conditions as the solution generated by the server solution generating means so as to be used for encrypting the server certificate and the SSL certificate in the server, and the client first encryption/decryption means is arranged to decrypt the encrypted server certificate and SSL certificate by using the second or subsequent solution generated by the client solution generating means.

5. The client according to claim 4, wherein the server transmits the server certificate encrypted by the server first encryption/decryption means to the client and transmits the server certificate in plain text to the client, and the client authentication means is arranged to verify whether the server certificate transmitted from the server is authorized or not, only when the server certificate decrypted by the client first encryption/decryption means and the server certificate transmitted from the server without having been encrypted are identical to each other.

6. A server connectable to a predetermined network so as to constitute a Secure Socket Layer (SSL) communication system in combination with a client, the server comprising:

a memory;

a processor in communication with the memory and operable, with instructions stored in the memory, to provide a private key;

a server certificate for proving authenticity of the server with a digital signature including a public key paired with the private key;

an SSL certificate for proving authenticity of the digital signature attached to the server certificate;

server solution generating means capable of successively generating solutions;

private-key decryption means capable of decrypting, with the private key, data encrypted by the public key; and server second encryption/decryption means capable of encryption and decryption in a common key system with a common key, the client connectable to the network including: an SSL certificate for proving the authenticity of the digital signature attached to the server certificate; client solution generating means capable of successively generating solutions identical to solutions generated by the server solution generating means under common conditions; client authentication means capable of verifying authenticity of the server certificate transmitted from the server, by using the SSL certificate transmitted from the server and the SSL certificate of the client; public-key encryption means capable of encryption using the public key, and client second encryption/decryption means capable of encryption and decryption in the common key system with the common key, wherein the server includes server authentication means for authenticating the client, the client generates the solution by the client solution generating means and transmits the solution to the server via the network, the server solution generating means is arranged to generate the solution under the same conditions as the solution generated by the client solution generating means, when the server receives the solution from the client via the network, the server authentication means is arranged to compare the solution generated by the server solution generating means and the solution received from the client and to authenticate the client when the solutions agree with each other, the server is arranged to transmit the server certificate and the SSL certificate of the server to the client via the network when the server authentication means authenticates the client, the client receives the server certificate and the SSL certificate, determines whether the server certificate transmitted from the server is authorized or not by the client authentication means by using the SSL certificate transmitted from the server and the SSL certificate of the client, and when the server certificate is authenticated, the client encrypts the common key of the client by the public-key encryption means and transmits the encrypted common key to the server via the network, the server is arranged to decrypt the encrypted and received common key with the private key by means of the private-key decryption means, and by using the common key shared between the server and the client in the above-mentioned steps, the server second encryption/decryption means encrypts and decrypts data to be transmitted and received and the client second encryption/decryption means encrypts and decrypts data to be transmitted and received, enabling encrypted communications with the client in the common key system.

7. The server according to claim 6, further comprising server first encryption/decryption means capable of encryption using the solution generated by the server solution generating means, wherein the server is arranged to generate the second or subsequent solution by means of the server solution generating means under predetermined conditions before transmitting the server certificate and the SSL certificate of the server to the client via the network, to encrypt the server certificate and the SSL certificate by means of the server first encryption/decryption means by using the solution generated by the server solution generating means, and to transmit the encrypted server certificate and SSL certificate to the client, the client includes client first encryption/decryption means capable of decrypting data encrypted by the server first encryption/decryption means, by using the solution generated by the client solution generating means when the same solution is used, the client solution generating means generates, when the client receives the encrypted server certificate and SSL certificate, the second or subsequent solution under the same conditions as the solution generated by the server solution generating means so as to be used for encrypting the server certificate and the SSL certificate in the server, and the client first encryption/decryption means decrypts the encrypted server certificate and SSL certificate by using the second or subsequent solution generated by the client solution generating means.

8. The sever according to claim 7, wherein the server is arranged to transmit the server certificate encrypted by the server first encryption/decryption means to the client and to transmit the server certificate in plain text to the client, and the client authentication means of the client verifies whether the server certificate transmitted from the server is authorized or not, only when the server certificate decrypted by the client first encryption/decryption means and the server certificate transmitted from the server without being encrypted are identical to each other.

9. A non-transitory computer readable storage media encoded with instructions that, when executed by a processor, cause the processor to, enable a computer to act as a client of an encrypted communication system comprising: a server connectable to a predetermined network, the server including a private key, a server certificate for proving authenticity of the server with a digital signature including a public key paired with the private key, a Secure Socket Layer (SSL) certificate for proving authenticity of the digital signature attached to the server certificate, and solution generating means capable of successively generating solutions, and the client connectable to the predetermined network, the client including an SSL certificate for proving the authenticity of the digital signature attached to the server certificate and solution generating means capable of successively generating solutions identical to those of the solution generating means of the server under common conditions, the instructions enabling the computer to perform the steps of:

generating the solution by the solution generating means and transmitting the solution to the server via the network;

receiving the server certificate and the SSL certificate of the server from server via the network, when the server received the solution from the client via the network, generated the solution by the solution generating means of the server under the same conditions as the solution generated by the solution generating means of the client, compared the solution generated by the solution generating means of the server and the solution received from the client, and authenticated the client when the solutions agree with each other, transmitted the server certificate and the SSL certificate to the client when the server authenticated the client;

verifying authenticity of the server certificate transmitted from the server, by using the SSL certificate transmitted from the server and the SSL certificate of the client;

encrypting, when the server certificate is authenticated, a common key of the client by using the public key included in the server certificate;

transmitting the encrypted common key to the server via the network; and performing encrypted communications with the server in the common key system by using the common key shared between the server and the client, and the common key available to the server is the common key which was transmitted from the client in encrypted manner and was obtained by decrypting the encrypted common key with the private key of the server.

10. A non-transitory computer readable medium encoded with instructions that, when executed by a processor, cause the processor to cause a computer to act as a server of an encrypted communication system comprising: the server connectable to a predetermined network, the server including a private key, a server certificate for proving authenticity of the server with a digital signature including a public key paired with the private key, a Secure Socket Layer (SSL) certificate for proving authenticity of the digital signature attached to the server certificate, and solution generating means capable of successively generating solutions, and the client connectable to the predetermined network, the client including an SSL certificate for proving the authenticity of the digital signature attached to the server certificate and solution generating means capable of successively generating solutions identical to those of the solution generating means of the server under common conditions, the instructions enabling the computer to perform the steps of:

receiving the solution which was generated by the solution generating means of the client and was transmitted from the client via the network;

generating the solution by the solution generating means of the server under the same conditions as the solution generated by the solution generating means of the client, comparing the solution generated by the solution generating means of the server and the solution received from the client, and authenticating the client when the solutions agree with each other;

transmitting the server certificate and the SSL certificate of the server to the client via the network when the server authenticates the client;

receiving a common key in the encrypted manner which is transmitted from the client via the network, when the client received the server certificate and the SSL certificate from the server via the network, encrypted the common key of the client by using the public key included in the server certificate when the server certificate transmitted from the server was authenticated by using the SSL certificate transmitted from the server and the SSL certificate of the client;

decrypting the encrypted common key with the private key of the server; and performing encrypted communications in a common key system with the client by using the common key shared between the server and the client in the above-mentioned steps.

11. The non-transitory computer readable medium encoded according to claim 9, wherein on the computer constituting the client, encryption and decryption in encrypted communications in the common key system are performed between a Transmission Control Protocol/Internet Protocol (TCP/IP) and a predetermined application for handling plain text data to be encrypted on the computer, and a plain text to be encrypted and transmitted to the server is generated by the application and is transferred to the TCP/IP, and encrypted data that is transmitted from the server and is transferred from the TCP/IP is decrypted into a plain text and then is transferred to the application.

12. The non-transitory computer readable medium encoded according to claim 10, wherein on the computer constituting the server, encryption and decryption in encrypted communications in the common key system are performed between a Transmission Control Protocol/Internet Protocol (TCP/IP) and a predetermined application for handling plain text data to be encrypted on the computer, and a plain text to be encrypted and transmitted to the client is generated by the application and is transferred to the TCP/IP, and encrypted data that is transmitted from the client and is transferred from the TCP/IP is decrypted into a plain text and then is transferred to the application.

* * * * *